United States Patent
Tominaga

(10) Patent No.: US 9,276,411 B2
(45) Date of Patent: Mar. 1, 2016

(54) ELECTRICITY SUPPLY SYSTEM

(75) Inventor: Ryuichiro Tominaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 603 days.

(21) Appl. No.: 13/700,325

(22) PCT Filed: Oct. 25, 2011

(86) PCT No.: PCT/JP2011/074525
§ 371 (c)(1),
(2), (4) Date: Nov. 27, 2012

(87) PCT Pub. No.: WO2012/057119
PCT Pub. Date: May 3, 2012

(65) Prior Publication Data
US 2013/0088083 A1    Apr. 11, 2013

(30) Foreign Application Priority Data
Oct. 27, 2010    (JP) .................................. 2010-240412

(51) Int. Cl.
| | |
|---|---|
| H02J 3/00 | (2006.01) |
| H02J 4/00 | (2006.01) |
| H02J 3/14 | (2006.01) |
| H02J 3/38 | (2006.01) |
| G06Q 50/06 | (2012.01) |

(52) U.S. Cl.
CPC . *H02J 4/00* (2013.01); *G06Q 50/06* (2013.01); *H02J 3/14* (2013.01); *H02J 3/383* (2013.01); *H02J 3/386* (2013.01); *Y02B 70/3225* (2013.01); *Y02E 10/563* (2013.01); *Y02E 10/763* (2013.01); *Y04S 20/222* (2013.01); *Y10T 307/549* (2015.04)

(58) Field of Classification Search
CPC .................................................. A61N 1/36032
USPC ........................................................... 307/48
See application file for complete search history.

(56) References Cited

U.S. PATENT DOCUMENTS

| | | | |
|---|---|---|---|
| 5,873,251 A | 2/1999 | Iino | |
| 8,447,452 B2 * | 5/2013 | Katoh et al. | 701/22 |

(Continued)

FOREIGN PATENT DOCUMENTS

| | | |
|---|---|---|
| JP | 09-179604 A | 7/1997 |
| JP | 2004-336890 A | 11/2004 |
| JP | 2006-280154 A | 10/2006 |

(Continued)

OTHER PUBLICATIONS

International Search Report mailed Jan. 31, 2012 issued in corresponding International Application No. PCT/JP2011/074525.

*Primary Examiner* — Stephen W Jackson
(74) *Attorney, Agent, or Firm* — McDermott Will & Emery LLP

(57) ABSTRACT

[Problem] To provide an electricity supply system that efficiently utilizes electricity. [Solution] An electricity supply system includes: a power generation unit (10) for supplying electricity; a load unit (11) for consuming at least one of the electricity supplied from the power generation unit (10) and system electricity supplied from an electricity system; and a control unit (12) for controlling operations of the power generation unit (10) and the load unit (11). The power generation unit (10) supplies electricity to the electricity system, and the control unit (12) controls the power generation unit (10) and the load unit (11) on the basis of values of a plurality of types of electricity handled by the electricity supply system.

8 Claims, 16 Drawing Sheets

(56) References Cited

U.S. PATENT DOCUMENTS 8,509,957 B2 * 8/2013 Tsuchiya ..................... 700/286
2004/0254899 A1 12/2004 Abe et al.

FOREIGN PATENT DOCUMENTS

JP      2006-296173 A    10/2006
JP      2010-016989 A    1/2010

* cited by examiner

FIG.2

| ELECTRICITY SALES RATE (YEN/kWh) ||
|---|---|
| WITH ONLY SOLAR PV UNIT | WITH POWER GENERATION-RELATED EQUIPMENT |
| 48 | 39 |

| TIME PERIOD | ELECTRICITY PURCHASE RATE (YEN/kWh) |
|---|---|
| HIGH-PRICE TIME PERIOD (7:00-17:00) | 30 |
| LOW-PRICE TIME PERIOD (17:00-7:00) | 14.5 |

FIG.4

| TIME PERIOD | GENERATED ELECTRICITY AMOUNT (kWh) | PRE-CONTROL LOAD ELECTRICITY CONSUMPTION AMOUNT (kWh) | PRE-CONTROL SALES ELECTRICITY AMOUNT (kWh) | PRE-CONTROL PURCHASE ELECTRICITY AMOUNT (kWh) |
|---|---|---|---|---|
| 0:00~1:00 | 0 | 0.3 | 0 | 0.3 |
| 1:00~2:00 | 0 | 0.2 | 0 | 0.2 |
| 2:00~3:00 | 0 | 0.2 | 0 | 0.2 |
| 3:00~4:00 | 0 | 0.3 | 0 | 0.3 |
| 4:00~5:00 | 0 | 0.3 | 0 | 0.3 |
| 5:00~6:00 | 0 | 0.3 | 0 | 0.3 |
| 6:00~7:00 | 0.3 | 0.3 | 0 | 0 |
| 7:00~8:00 | 0.3 | 0.5 | 0 | 0.2 |
| 8:00~9:00 | 1.0 | 1.3 | 0 | 0.3 |
| 9:00~10:00 | 1.7 | 0.5 | 1.2 | 0 |
| 10:00~11:00 | 2.2 | 0.5 | 1.7 | 0 |
| 11:00~12:00 | 2.4 | 1.3 | 1.1 | 0 |
| 12:00~13:00 | 2.4 | 1.3 | 1.1 | 0 |
| 13:00~14:00 | 2.4 | 1.3 | 1.1 | 0 |
| 14:00~15:00 | 2.2 | 1.3 | 0.9 | 0 |
| 15:00~16:00 | 1.7 | 1.2 | 0.5 | 0 |
| 16:00~17:00 | 1.0 | 0.6 | 0.4 | 0 |
| 17:00~18:00 | 0.3 | 0.6 | 0 | 0.3 |
| 18:00~19:00 | 0 | 0.9 | 0 | 0.9 |
| 19:00~20:00 | 0 | 0.9 | 0 | 0.9 |
| 20:00~21:00 | 0 | 0.9 | 0 | 0.9 |
| 21:00~22:00 | 0 | 0.8 | 0 | 0.8 |
| 22:00~23:00 | 0 | 0.7 | 0 | 0.7 |
| 23:00~24:00 | 0 | 0.6 | 0 | 0.6 |
| TOTAL | 17.9 | 17.1 | 8.0 | 7.2 |

FIG.6

| TIME PERIOD | GENERATED ELECTRICITY AMOUNT (kWh) | POST-CONTROL SALES ELECTRICITY AMOUNT (kWh) | POST-CONTROL LOAD ELECTRICITY CONSUMPTION AMOUNT (kWh) | SAVED ELECTRICITY AMOUNT (kWh) | POST-CONTROL PURCHASE ELECTRICITY AMOUNT (kWh) |
|---|---|---|---|---|---|
| 0:00~1:00 | 0 | 0 | 0.3 | 0 | 0.3 |
| 1:00~2:00 | 0 | 0 | 0.2 | 0 | 0.2 |
| 2:00~3:00 | 0 | 0 | 0.2 | 0 | 0.2 |
| 3:00~4:00 | 0 | 0 | 0.3 | 0 | 0.3 |
| 4:00~5:00 | 0 | 0 | 0.3 | 0 | 0.3 |
| 5:00~6:00 | 0 | 0 | 1.1 | 0 | 1.1 |
| 6:00~7:00 | 0.3 | 0.1 | 0.3 | 0 | 0.1 |
| 7:00~8:00 | 0.3 | 0.1 | 0.4 | 0 | 0.2 |
| 8:00~9:00 | 1.0 | 0.5 | 0.5 | 0.8 | 0 |
| 9:00~10:00 | 1.7 | 1.0 | 0.7 | 0 | 0 |
| 10:00~11:00 | 2.2 | 1.5 | 0.7 | 0 | 0 |
| 11:00~12:00 | 2.4 | 1.7 | 0.7 | 0 | 0 |
| 12:00~13:00 | 2.4 | 1.7 | 0.7 | 0 | 0 |
| 13:00~14:00 | 2.4 | 1.7 | 0.7 | 0 | 0 |
| 14:00~15:00 | 2.2 | 1.5 | 0.7 | 0 | 0 |
| 15:00~16:00 | 1.7 | 1.0 | 0.7 | 0.5 | 0 |
| 16:00~17:00 | 1.0 | 0.5 | 0.5 | 0 | 0 |
| 17:00~18:00 | 0.3 | 0.1 | 0.4 | 0 | 0.2 |
| 18:00~19:00 | 0 | 0 | 1.4 | 0 | 1.4 |
| 19:00~20:00 | 0 | 0 | 0.9 | 0 | 0.9 |
| 20:00~21:00 | 0 | 0 | 0.9 | 0 | 0.9 |
| 21:00~22:00 | 0 | 0 | 0.8 | 0 | 0.8 |
| 22:00~23:00 | 0 | 0 | 0.7 | 0 | 0.7 |
| 23:00~24:00 | 0 | 0 | 0.6 | 0 | 0.6 |
| TOTAL | 17.9 | 11.4 | 14.7 | 1.3 | 8.2 |

| | SALES ELECTRICITY VALUE (YEN/DAY) | PURCHASE ELECTRICITY VALUE (YEN/DAY) | COST ADVANTAGE (YEN/DAY) |
|---|---|---|---|
| BEFORE CONTROL | 384 | 112.15 | 271.85 |
| AFTER CONTROL | 547 | 122 | 425 |

FIG.12

| TIME PERIOD | GENERATED ELECTRICITY AMOUNT (kWh) | CHARGE AMOUNT (kWh) | DISCHARGE AMOUNT (kWh) | PRE-CONTROL LOAD ELECTRICITY CONSUMPTION AMOUNT (kWh) | PRE-CONTROL SALES ELECTRICITY AMOUNT (kWh) | PRE-CONTROL PURCHASE ELECTRICITY AMOUNT (kWh) |
|---|---|---|---|---|---|---|
| 0:00~1:00 | 0 | 1.0 | 0 | 0.3 | 0 | 1.3 |
| 1:00~2:00 | 0 | 1.0 | 0 | 0.2 | 0 | 1.2 |
| 2:00~3:00 | 0 | 0.5 | 0 | 0.2 | 0 | 0.7 |
| 3:00~4:00 | 0 | 0 | 0 | 0.3 | 0 | 0.3 |
| 4:00~5:00 | 0 | 0 | 0 | 0.3 | 0 | 0.3 |
| 5:00~6:00 | 0 | 0 | 0 | 0.3 | 0 | 0.3 |
| 6:00~7:00 | 0.3 | 0 | 0 | 0.3 | 0 | 0 |
| 7:00~8:00 | 0.3 | 0 | 0 | 0.5 | 0 | 0.2 |
| 8:00~9:00 | 1.0 | 0 | 0.3 | 1.3 | 0 | 0 |
| 9:00~10:00 | 1.7 | 0 | 0.3 | 0.5 | 1.5 | 0 |
| 10:00~11:00 | 2.2 | 0 | 0.3 | 0.5 | 2.0 | 0 |
| 11:00~12:00 | 2.4 | 0 | 0.3 | 1.3 | 1.4 | 0 |
| 12:00~13:00 | 2.4 | 0 | 0.3 | 1.3 | 1.4 | 0 |
| 13:00~14:00 | 2.4 | 0 | 0.3 | 1.3 | 1.4 | 0 |
| 14:00~15:00 | 2.2 | 0 | 0.3 | 1.3 | 1.2 | 0 |
| 15:00~16:00 | 1.7 | 0 | 0.3 | 1.2 | 0.8 | 0 |
| 16:00~17:00 | 1.0 | 0 | 0.1 | 0.6 | 0.5 | 0 |
| 17:00~18:00 | 0.3 | 0 | 0 | 0.6 | 0 | 0.3 |
| 18:00~19:00 | 0 | 0 | 0 | 0.9 | 0 | 0.9 |
| 19:00~20:00 | 0 | 0 | 0 | 0.9 | 0 | 0.9 |
| 20:00~21:00 | 0 | 0 | 0 | 0.9 | 0 | 0.9 |
| 21:00~22:00 | 0 | 0 | 0 | 0.8 | 0 | 0.8 |
| 22:00~23:00 | 0 | 0 | 0 | 0.7 | 0 | 0.7 |
| 23:00~24:00 | 0 | 0 | 0 | 0.6 | 0 | 0.6 |
| TOTAL | 17.9 | 2.5 | 2.5 | 17.1 | 10.2 | 9.4 |

FIG.13

| TIME PERIOD | GENERATED ELECTRICITY AMOUNT (kWh) | CHARGE AMOUNT (kWh) | DISCHARGE AMOUNT (kWh) | POST-CONTROL SALES ELECTRICITY AMOUNT (kWh) | POST-CONTROL LOAD ELECTRICITY CONSUMPTION AMOUNT (kWh) | SAVED ELECTRICITY AMOUNT (kWh) | POST-CONTROL PURCHASE ELECTRICITY AMOUNT (kWh) |
|---|---|---|---|---|---|---|---|
| 0:00~1:00 | 0 | 1.0 | 0 | 0 | 0.3 | 0 | 1.3 |
| 1:00~2:00 | 0 | 1.0 | 0 | 0 | 0.2 | 0 | 1.2 |
| 2:00~3:00 | 0 | 0.5 | 0 | 0 | 0.2 | 0 | 0.7 |
| 3:00~4:00 | 0 | 0 | 0 | 0 | 0.3 | 0 | 0.3 |
| 4:00~5:00 | 0 | 0 | 0 | 0 | 0.3 | 0 | 0.3 |
| 5:00~6:00 | 0 | 0 | 0 | 0 | 0.9 | 0 | 0.9 |
| 6:00~7:00 | 0.3 | 0 | 0 | 0.1 | 0.3 | 0 | 0.1 |
| 7:00~8:00 | 0.3 | 0 | 0 | 0.1 | 0.4 | 0 | 0.2 |
| 8:00~9:00 | 1.0 | 0 | 0.3 | 0.8 | 0.5 | 0.8 | 0 |
| 9:00~10:00 | 1.7 | 0 | 0.3 | 1.3 | 0.7 | 0 | 0 |
| 10:00~11:00 | 2.2 | 0 | 0.3 | 1.8 | 0.7 | 0 | 0 |
| 11:00~12:00 | 2.4 | 0 | 0.3 | 2.0 | 0.7 | 0 | 0 |
| 12:00~13:00 | 2.4 | 0 | 0.3 | 2.0 | 0.7 | 0 | 0 |
| 13:00~14:00 | 2.4 | 0 | 0.3 | 2.0 | 0.7 | 0 | 0 |
| 14:00~15:00 | 2.2 | 0 | 0.3 | 1.8 | 0.7 | 0 | 0 |
| 15:00~16:00 | 1.7 | 0 | 0.3 | 1.3 | 0.7 | 0.5 | 0 |
| 16:00~17:00 | 1.0 | 0 | 0.1 | 0.6 | 0.5 | 0 | 0 |
| 17:00~18:00 | 0.3 | 0 | 0 | 0.1 | 0.4 | 0 | 0.2 |
| 18:00~19:00 | 0 | 0 | 0 | 0 | 1.4 | 0 | 1.4 |
| 19:00~20:00 | 0 | 0 | 0 | 0 | 0.9 | 0 | 0.9 |
| 20:00~21:00 | 0 | 0 | 0 | 0 | 0.9 | 0 | 0.9 |
| 21:00~22:00 | 0 | 0 | 0 | 0 | 0.8 | 0 | 0.8 |
| 22:00~23:00 | 0 | 0 | 0 | 0 | 0.7 | 0 | 0.7 |
| 23:00~24:00 | 0 | 0 | 0 | 0 | 0.6 | 0 | 0.6 |
| TOTAL | 17.9 | 2.5 | 2.5 | 13.9 | 14.7 | 1.3 | 10.5 |

FIG.14

| | SALES ELECTRICITY VALUE (YEN/DAY) | PURCHASE ELECTRICITY VALUE (YEN/DAY) | COST ADVANTAGE (YEN/DAY) |
|---|---|---|---|
| BEFORE CONTROL | 397.8 | 139.4 | 258.4 |
| AFTER CONTROL | 542.1 | 155.35 | 386.75 |

FIG.15

| PATTERN | ELECTRICITY SALES RATE (YEN/kWh) | ENVIRONMENTAL ADDED VALUE RATE (YEN/kWh) |
|---|---|---|
| $1^{ST}$ | 24 | 5 |
| $2^{ND}$ | 12 | 5 |
| $3^{RD}$ | 6 | 10 |

FIG.17

| TIME PERIOD | GENERATED ELECTRICITY AMOUNT (kWh) | LOAD ELECTRICITY CONSUMPTION AMOUNT (kWh) | SELF-CONSUMPTION ELECTRICITY AMOUNT (kWh) | PRE-CONTROL CHARGE AMOUNT (kWh) | PRE-CONTROL DISCHARGE AMOUNT (kWh) | PRE-CONTROL SALES ELECTRICITY AMOUNT (kWh) | PRE-CONTROL PURCHASE ELECTRICITY AMOUNT (kWh) |
|---|---|---|---|---|---|---|---|
| 7:00~8:00 | 0.3 | 0.5 | 0.3 | 0 | 0 | 0 | 0.2 |
| 8:00~9:00 | 1.0 | 1.3 | 1.0 | 0 | 0 | 0 | 0.3 |
| 9:00~10:00 | 1.7 | 0.5 | 0.5 | 0 | 0 | 1.2 | 0 |
| 10:00~11:00 | 2.2 | 0.5 | 0.5 | 0 | 0 | 1.7 | 0 |
| 11:00~12:00 | 2.4 | 1.3 | 1.3 | 0 | 0 | 1.1 | 0 |
| 12:00~13:00 | 2.4 | 1.3 | 1.3 | 0 | 0 | 1.1 | 0 |
| 13:00~14:00 | 2.4 | 1.3 | 1.3 | 0 | 0 | 1.1 | 0 |
| 14:00~15:00 | 2.2 | 1.3 | 1.3 | 0 | 0 | 0.9 | 0 |
| 15:00~16:00 | 1.7 | 1.2 | 1.2 | 0 | 0 | 0.5 | 0 |
| 16:00~17:00 | 1.0 | 0.6 | 0.6 | 0 | 0 | 0.4 | 0 |
| 17:00~18:00 | 0.3 | 0.6 | 0.3 | 0 | 0 | 0 | 0.3 |
| 18:00~19:00 | 0 | 0.9 | 0 | 0 | 0 | 0 | 0.9 |
| 19:00~20:00 | 0 | 0.9 | 0 | 0 | 0 | 0 | 0.9 |
| 20:00~21:00 | 0 | 0.9 | 0 | 0 | 0 | 0 | 0.9 |
| 21:00~22:00 | 0 | 0.8 | 0 | 0 | 0 | 0 | 0.8 |
| 22:00~23:00 | 0 | 0.7 | 0 | 0 | 0 | 0 | 0.7 |
| 23:00~24:00 | 0 | 0.6 | 0 | 0 | 0 | 0 | 0.6 |
| 0:00~1:00 | 0 | 0.3 | 0 | 0 | 0 | 0 | 0.3 |
| 1:00~2:00 | 0 | 0.2 | 0 | 0 | 0 | 0 | 0.2 |
| 2:00~3:00 | 0 | 0.2 | 0 | 0 | 0 | 0 | 0.2 |
| 3:00~4:00 | 0 | 0.3 | 0 | 0 | 0 | 0 | 0.3 |
| 4:00~5:00 | 0 | 0.3 | 0 | 0 | 0 | 0 | 0.3 |
| 5:00~6:00 | 0 | 0.3 | 0 | 0 | 0 | 0 | 0.3 |
| 6:00~7:00 | 0.3 | 0.3 | 0.3 | 0 | 0 | 0 | 0 |
| TOTAL | 17.9 | 17.1 | 9.9 | 0 | 0 | 8.0 | 7.2 |

FIG.18

| TIME PERIOD | GENERATED ELECTRICITY AMOUNT (kWh) | LOAD ELECTRICITY CONSUMPTION AMOUNT (kWh) | SELF-CONSUMPTION ELECTRICITY AMOUNT (kWh) | POST-CONTROL CHARGE AMOUNT (kWh) | POST-CONTROL DISCHARGE AMOUNT (kWh) | REMAINING CAPACITY (kWh) | POST-CONTROL SALES ELECTRICITY AMOUNT (kWh) | POST-CONTROL PURCHASE ELECTRICITY AMOUNT (kWh) |
|---|---|---|---|---|---|---|---|---|
| 7:00~8:00 | 0.3 | 0.5 | 0.3 | 0 | 0 | 0 | 0 | 0.2 |
| 8:00~9:00 | 1.0 | 1.3 | 1.0 | 0 | 0 | 0 | 0 | 0.3 |
| 9:00~10:00 | 1.7 | 0.5 | 0.5 | 1.2 | 0 | 1.2 | 0 | 0 |
| 10:00~11:00 | 2.2 | 0.5 | 0.5 | 1.7 | 0 | 2.9 | 0 | 0 |
| 11:00~12:00 | 2.4 | 1.3 | 1.3 | 1.1 | 0 | 4.0 | 0 | 0 |
| 12:00~13:00 | 2.4 | 1.3 | 1.3 | 1.1 | 0 | 5.1 | 0 | 0 |
| 13:00~14:00 | 2.2 | 1.3 | 1.3 | 0.9 | 0 | 6.2 | 0 | 0 |
| 14:00~15:00 | 1.7 | 1.2 | 1.2 | 0.5 | 0 | 7.1 | 0 | 0 |
| 15:00~16:00 | 1.0 | 0.6 | 0.6 | 0.4 | 0 | 7.6 | 0 | 0 |
| 16:00~17:00 | 0.3 | 0.6 | 0.3 | 0 | 0.3 | 8.0 | 0 | 0 |
| 17:00~18:00 | 0 | 0.9 | 0 | 0 | 0.9 | 7.7 | 0 | 0 |
| 18:00~19:00 | 0 | 0.9 | 0 | 0 | 0.9 | 6.8 | 0 | 0 |
| 19:00~20:00 | 0 | 0.9 | 0 | 0 | 0.9 | 5.9 | 0 | 0 |
| 20:00~21:00 | 0 | 0.8 | 0 | 0 | 0.8 | 5.0 | 0 | 0 |
| 21:00~22:00 | 0 | 0.7 | 0 | 0 | 0.7 | 4.2 | 0 | 0 |
| 22:00~23:00 | 0 | 0.6 | 0 | 0 | 0.6 | 3.5 | 0 | 0 |
| 23:00~24:00 | 0 | 0.3 | 0 | 0 | 0.3 | 2.9 | 0 | 0 |
| 0:00~1:00 | 0 | 0.2 | 0 | 0 | 0.2 | 2.6 | 0 | 0 |
| 1:00~2:00 | 0 | 0.2 | 0 | 0 | 0.2 | 2.4 | 0 | 0 |
| 2:00~3:00 | 0 | 0.3 | 0 | 0 | 0.3 | 2.2 | 0 | 0 |
| 3:00~4:00 | 0 | 0.3 | 0 | 0 | 0.3 | 1.9 | 0 | 0 |
| 4:00~5:00 | 0 | 0.3 | 0 | 0 | 0.3 | 1.6 | 0 | 0 |
| 5:00~6:00 | 0 | 0.3 | 0 | 0 | 0.3 | 1.3 | 0 | 0 |
| 6:00~7:00 | 0.3 | 0.3 | 0.3 | 0 | 0 | 1.3 | 0 | 0 |
| TOTAL | 17.9 | 17.1 | 9.9 | 8.0 | 6.7 | | 0 | 0.5 |

FIG.19

| EA | SOC | OPERATION |
|---|---|---|
| POSITIVE OR 0 | SOC_MAX | SELL ELECTRICITY |
| | POSITIVE | CHARGE |
| | 0 | CHARGE |
| NEGATIVE | SOC_MAX | DISCHARGE |
| | POSITIVE | DISCHARGE |
| | 0 | PURCHASE ELECTRICITY |

FIG.20

- 1ST PATTERN

| | SALES ELECTRICITY VALUE (YEN/DAY) | PURCHASE ELECTRICITY VALUE (YEN/DAY) | ENVIRONMENTAL ADDED VALUE (YEN/DAY) | COST ADVANTAGE (YEN/DAY) |
|---|---|---|---|---|
| BEFORE CONTROL | 192 | 112.15 | 49.5 | 129.35 |
| AFTER CONTROL | 0 | 15 | 83 | 68 |

- 2ND PATTERN

| | SALES ELECTRICITY VALUE (YEN/DAY) | PURCHASE ELECTRICITY VALUE (YEN/DAY) | ENVIRONMENTAL ADDED VALUE (YEN/DAY) | COST ADVANTAGE (YEN/DAY) |
|---|---|---|---|---|
| BEFORE CONTROL | 96 | 112.15 | 49.5 | 33.35 |
| AFTER CONTROL | 0 | 15 | 83 | 68 |

- 3RD PATTERN

| | SALES ELECTRICITY VALUE (YEN/DAY) | PURCHASE ELECTRICITY VALUE (YEN/DAY) | ENVIRONMENTAL ADDED VALUE (YEN/DAY) | COST ADVANTAGE (YEN/DAY) |
|---|---|---|---|---|
| BEFORE CONTROL | 48 | 112.15 | 99 | 34.85 |
| AFTER CONTROL | 0 | 15 | 166 | 151 |

ELECTRICITY SUPPLY SYSTEM

RELATED APPLICATIONS

This application is the U.S. National Phase under 35 U.S.C. §371 of International Application No. PCT/JP2011/074525, filed on Oct. 25, 2011, which in turn claims the benefit of Japanese Application No. 2010-240412, filed on Oct. 27, 2010, the disclosures of which Applications are incorporated by reference herein.

TECHNICAL FIELD

The present invention is related to an electricity supply system that supplies electricity.

BACKGROUND ART

There have been proposed electricity supply systems that supply electricity to loads (appliances such as a refrigerator, a washing machine, and an air conditioner) by using not only electricity supplied (purchased) from an electricity distribution facility (hereinafter, an electricity system) managed by an electricity company (such electricity will hereinafter be referred to as "system electricity") but also various kinds of electricity (various electricities) generated by various methods, such as electricity that is generated by, and supplied from, a power generating unit such as a solar photovoltaic power generating unit, and electricity discharged and supplied from a battery. Some of such electricity supply systems supply (sell), to the electricity system, excess electricity that is generated and supplied by an electricity generator but is not consumed by a load or the like.

Electricity consumption of a load may include general electricity consumption (caused by, for example, the operation of an appliance such as a refrigerator, for example) which constantly occurs regardless of time of day, and particular electricity consumption (caused by, for example, the operation of an appliance such as a washing machine) which occurs exclusively at a particular time of day. Where reduction of system electricity cost is required, it is effective to reduce cost of the particular electricity consumption. For example, it is possible to reduce the particular electricity consumption cost by setting the particular electricity consumption to occur at a time when per-unit price of the system electricity (hereinafter, an electricity purchase rate) is low.

For example, Patent Literature 1 proposes an electricity supply system that informs a user of time when the particular electricity consumption can be covered with excess electricity (and thus the particular electricity consumption cost can be reduced to 0), to thereby prompt the user to set the particular electricity consumption to occur at that time. Furthermore, this electricity supply system displays the electricity purchase rate and a per-unit selling price of electricity (hereinafter, an electricity sales rate) to the user, to thereby assist the user in deciding whether to sell the excess electricity or use it to cover the particular electricity consumption therewith.

CITATION LIST

Patent Literature 1: JP-A-2010-16989

SUMMARY OF INVENTION

Technical Problem

However, with the electricity supply system proposed in Patent Literature 1, it is necessary for the user to decide how to use the excess electricity and to use it accordingly, and this is rather troublesome to the user. In addition, if the user is unaccustomed to using the system, it is difficult for him or her to make a correct decision, and thus, the system electricity cost cannot be reduced effectively, which is disadvantageous.

Furthermore, these problems could become obstacles to achieving widespread use of electricity supply systems that make use of various electricities (that is, prevent reduction or leveling of consumption of the system electricity). This, in turn, prevents reduction of $CO_2$ emission by electricity generation (especially, thermal electricity generation), making it difficult to solve problems such as global warming.

In view of the aforementioned, an object of the present invention is to provide an electricity supply system that makes effective use of electricity.

Solution to Problem

To achieve the above object, according to the present invention, an electricity supply system includes an electricity supply portion which supplies electricity, a load portion which consumes at least one of electricity supplied from the electricity supply portion and electricity supplied from an electricity system, and a control portion which controls an operation of the electricity supply portion and an operation of the load portion. Here, the electricity supply portion is capable of supplying electricity to the electricity system, and the control portion controls the electricity supply portion and the load portion based on values of a plurality of electricities that the electricity supply system deals with.

Advantageous Effects of Invention

According to a configuration of the present invention, a control portion controls an electricity supply portion and a load portion based on values of a plurality of electricities that the electricity supply system deals with. This makes it possible to make effective use of electricity.

The significance and benefits of the invention will be clear from the following description of first to third embodiment. It should however be understood that the first to third embodiments below are merely examples of how the invention is implemented, and that the meanings of the terms used to describe the invention and its features are not limited to the specific ones in which they are used in the description of the embodiments.

BRIEF DESCRIPTION OF DRAWINGS

FIG. 2 is a table showing examples of electricity sales and purchase rates;

FIG. 4 is a table showing an example of an operation result before the control shown in FIG. 3;

FIG. 6 is a table showing an example of an operation result after the control shown in FIG. 3;

FIG. 12 is a table showing an example of an operation result before the control shown in FIG. 11;

FIG. 13 is a table showing an example of an operation result after the control shown in FIG. 11;

FIG. 14 is a table showing the comparison between cost advantage derived from the operation result shown in the table of FIG. 12 and cost advantage derived from the operation result shown in the table of FIG. 13;

FIG. 15 is a table showing examples of the electricity sales rate and the environmental added value rate (first to third patterns);

FIG. 17 is a table showing an example of an operation result before the control shown in FIG. 16;

FIG. 18 is a table showing an example of an operation result after the control shown in FIG. 16;

FIG. 19 is a table showing part of the controlling method shown in FIG. 16; and

FIG. 20 are tables related to the first to third patterns shown in FIG. 15, showing the comparison between cost advantage derived from the operation result shown in the table of FIG. 17 and cost advantage derived from the operation result shown in the table of FIG. 18, on a one-by-one basis of the first to third patterns shown in FIG. 15.

DESCRIPTION OF EMBODIMENTS

<<First Embodiment>>
<Configuration Example of Electricity Supply System>

Figure 1:
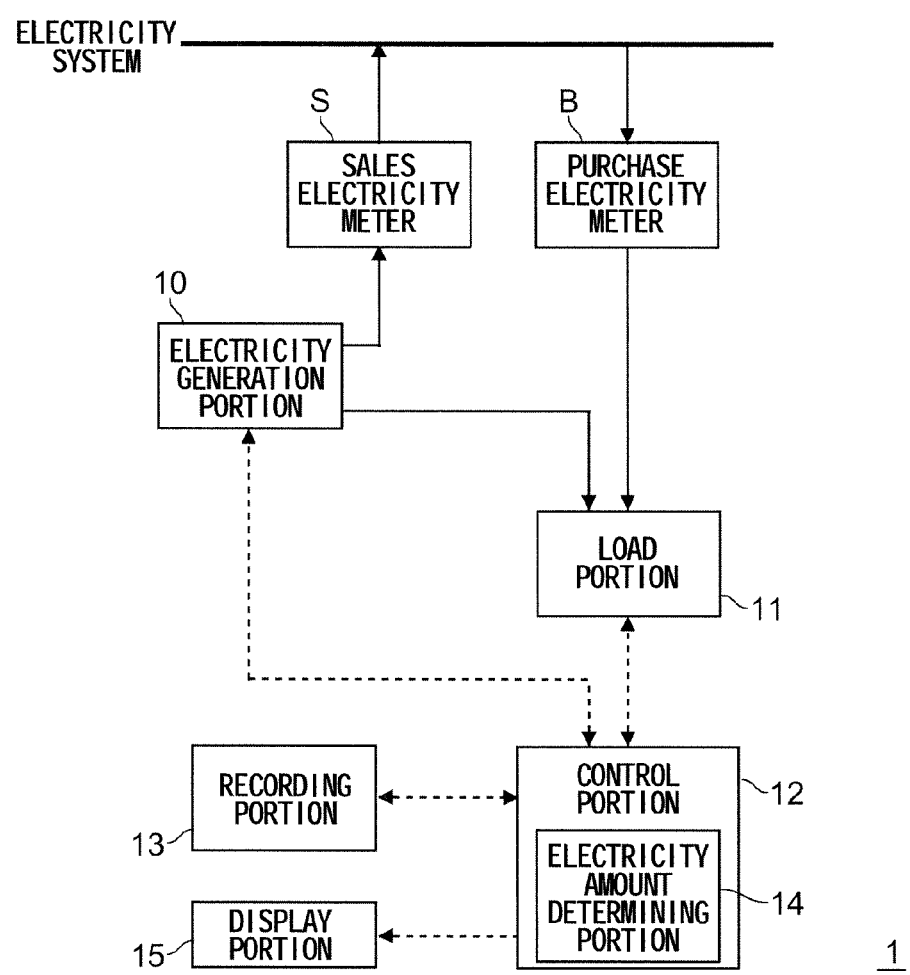
FIG. 1 is a block diagram showing a configuration example of an electricity supply system according to a first embodiment of the present invention.

First, a description will be given of a configuration example of an electricity supply system according to a first embodiment of the present invention, with reference to FIG. 1. FIG. 1 is a block diagram showing the configuration example of the electricity supply system according to the first embodiment of the present invention.

As shown in FIG. 1, an electricity supply system 1 includes an electricity generation portion 10 which generates and supplies electricity, a load portion 11 which is formed of a load which operates by consuming electricity supplied thereto, a control portion 12 which controls an operation of the electricity generation portion 10 and an operation of the load portion 11, and a recording portion 13 which records various kinds of information.

The electricity generation portion 10 supplies electricity by generating the electricity by, for example, converting optical energy (solar light, for example) into electricity (solar photovoltaic power generation) or converting kinetic energy of wind (rotation of a wind mill, for example) into electricity (power generation by wind). The electricity generation portion 10 may convert any kind of energy into electricity, but for specific description of the embodiment, a case will be dealt with below where the electricity generation portion 10 supplies electricity that it generates by solar photovoltaic power generation.

The electricity that the electricity generation portion 10 generates and supplies is supplied to the load portion 11, and in addition, it is able to be supplied (sold) to an electricity system. The amount of electricity that the electricity generation portion 10 supplies to the electricity system is measured by a sales electricity meter S, and reported to an electricity company that manages the electricity system.

At least one of the system electricity and the electricity supplied by the electricity generation portion 10 is supplied to the load portion 11. The load included in the load portion 11 operates by consuming the thus supplied electricity. The amount of system electricity consumed by the load portion 11 is measured by a purchase electricity meter B, and reported to the electricity company that manages the electricity system.

The control portion 12 acquires from the electricity generation portion 10 information of the electricity that the electricity generation portion 10 supplies by electricity generation, and the control portion 12 also acquires from the load portion 11 information of the electricity that the load portion 11 consumes. In addition, the control portion 12 records the thus acquired information in the recording portion 13 as necessary.

In addition to the information mentioned above, the recording portion 13 records information of electricity that is able to be consumed by each of loads included in the load portion 11 (for example, electricity that a load is able to consume in its normal operation, and an average value of electricity consumed by the loads). Furthermore, the recording portion 13 records externally inputted information such as the electricity sales rate and the electricity purchase rate (which are inputted, for example, by the electricity company on-line or the like, or by a user's operation).

Based on the information acquired from the electricity generation portion 10 and the load portion 11 and the information recorded in the recording portion 13, the control portion 12 controls the operation of the electricity generation portion 10 (for example, where to supply the electricity obtained by the electricity generation) and the operation of the load portion 11 (for example, the operation timing of the load, the amount of electricity consumed by the load). An electricity amount determining portion 14 determines what amount of the electricity obtained by the electricity generation is to be supplied and the amount of electricity to be consumed by the load. Details of how the control portion 12 controls the operation of the electricity generation portion 10 and the operation of the load portion 11 will be described later.

Each amount of electricity determined by the electricity amount determining portion 14 may be displayed on a display portion 15. This makes it possible for the user to perform manual operation (by hand) based on the thus determined electricity amounts.

Here, the control portion 12 may record the amount of electricity generated by the electricity generation portion 10 and the amount of electricity consumed by the load portion 11 in connection with information of various conditions such as the time of the day and the time of the year (for example, the season), the weather condition (for example, the sky condition and the temperature, presence of the sunshine), and the like. In this case, the control portion 12 may acquire at least part of the information externally on-line or the like, or from an apparatus provided in the electricity supply system 1 to measure the information.

<Examples of how Control Portion Controls Electricity Generation Portion and Load Portion>

Figure 3:
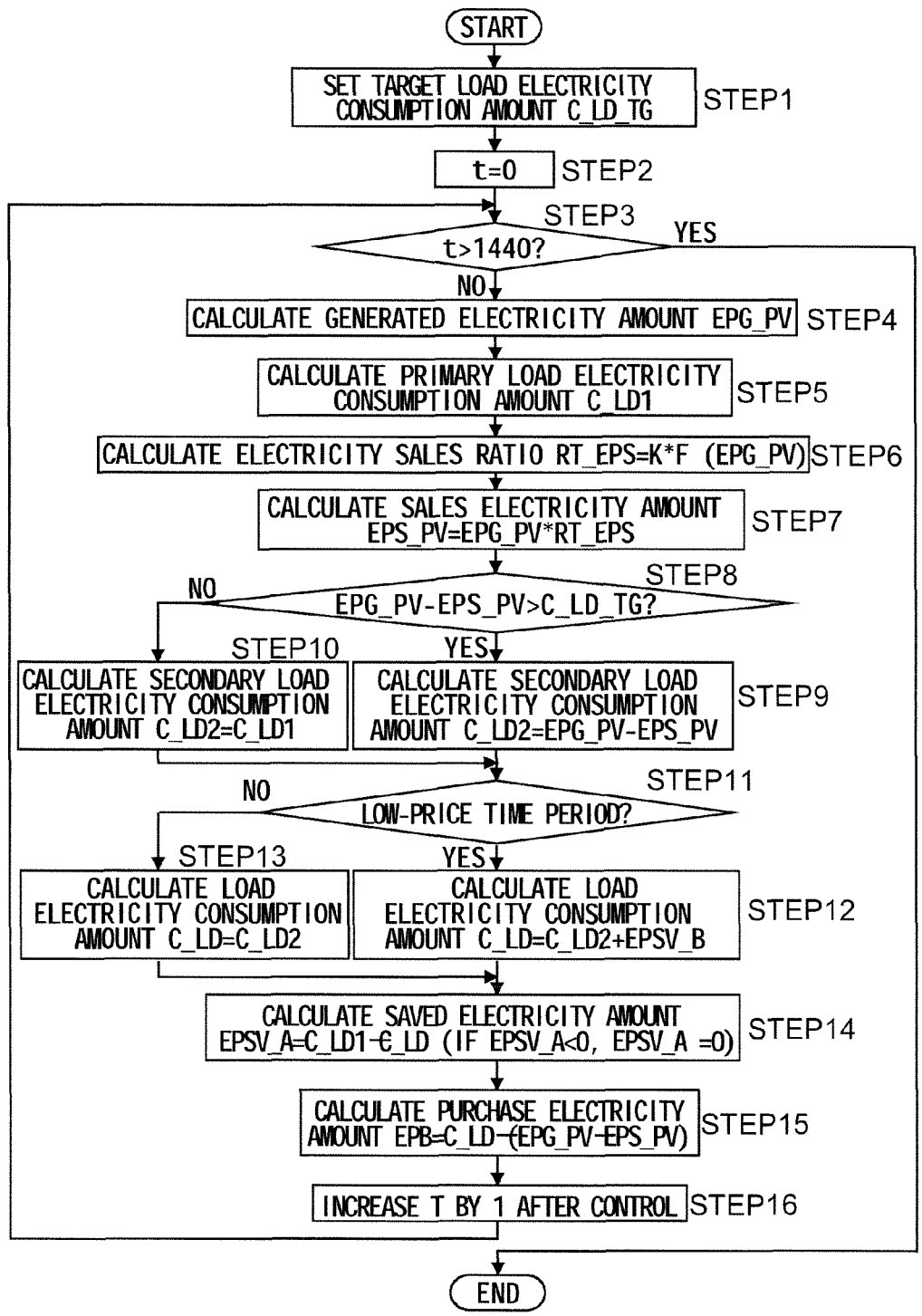
FIG. 3 is a flow chart showing an example of the method of controlling an electricity generation portion and a load portion performed by a control portion provided in the electricity supply system according to the first embodiment of the present invention.

Next, details of how the control portion 12 controls the operation of the electricity generation portion 10 and the operation of the load portion 11 will be described with reference to the accompanying drawings and dealing with specific examples. FIG. 2 is a table showing examples of the electricity sales and purchase rates. FIG. 3 is a flow chart showing an example of the method of controlling the electricity generation portion and the load portion performed by the control portion provided in the electricity supply system according to the first embodiment of the present invention.

In the following, for a specific description, the electricity sales and purchase rates are assumed to be as shown in the table of FIG. 2. However, the electricity supply system 1 of the first embodiment includes only a solar photovoltaic power generating unit (the electricity generation portion 10) and does not include any other power generation-related equipment (such as an electricity storage portion), the electricity sales rate is 48 yen/kWh. More specifically, the electricity purchase rate of a high-price time period (from 7:00 to 17:00) is 30 yen/kWh, and the electricity purchase rate of a low-price time period (from 17:00 to 7:00) is 14.5 yen/kWh. In this case, the electricity sales rate is comparatively high.

As shown in FIG. 3, the control portion 12 first sets a target load electricity consumption amount C_LD_TG (STEP 1). The target load electricity consumption amount C_LD_TG indicates a component of the amount of electricity consumed by the load portion 11 in control time (hereinafter, the amount of electricity consumed by the load portion 11 in control time will be referred to as a "load electricity consumption amount") that appears constantly regardless of time. For example, the control portion 12 calculates and sets the target load electricity consumption amount C_LD_TG by reference to an amount of electricity consumed by the load portion 11 in the past and recorded in the recording portion 13. In doing so, the control portion 12 may calculate the target load electricity consumption amount C_LD_TG by considering various conditions such as time in the day and time in the year when the control portion controls the electricity generation portion 10 and the load portion 11, and weather under which the control portion controls the electricity generation portion 10 and the load portion 11 (specifically, by reference particularly to an amount of electricity consumed by the load portion 11 under similar conditions in the past).

Next, the control portion 12 sets a variable t to 0 (STEP 2). The control portion 12 performs control of the electricity generation portion 10 and control of the load portion 11 every control time (for example, one minute), and the variable t indicates an accumulated amount of passed control time. For specific descriptions, the following will deal with cases where the control time is one minute.

The control portion 12 continues to perform a series of control operations (STEP 4 to STEP 16) described later until it detects that a predetermined amount of control time (for example, 1440 minutes=one day) has passed (that is, the variable t becomes larger than 1440) (STEP 3, No). On the other hand, when the control portion 12 detects that the predetermined amount of control time has passed (STEP 3, YES), it finishes the control operations. For specific descriptions, the following will deal with cases where the predetermined amount of control time is 1440 minutes. The control portion 12 is able to repeatedly perform the unit of 1440-minute operation every day.

If the control portion 12 detects that the variable t is smaller than 1440, it calculates a generated electricity amount EPG_PV, which is an amount of electricity that the electricity generation portion 10 generates and supplies in the control time (STEP 4). For example, the control portion 12 calculates the generated electricity amount EPG_PV by acquiring, from the electricity generation portion 10, information indicating the amount of electricity that the electricity generation portion 10 generates and supplies.

The control portion 12 also calculates a primary load electricity consumption amount C_LD1, which is an amount of electricity that the load portion 11 consumes if the control portion 12 does not control the operation of the load portion 11 (STEP 5). For example, the control portion 12 calculates the primary load electricity consumption amount C_LD1 by acquiring, from the load portion 11, information indicating an amount of electricity that the load portion 11 consumes or by referring to details of the control of the operation of the load portion 11 by the control portion 12.

Next, the control portion 12 calculates an electricity sales ratio RT_EPS (STEP 6). The electricity sales ratio RT_EPS is calculated by multiplying a function f (EPG_PV) of the generated electricity amount by a coefficient K. The function f (EPG_PV) increases gradually as the generated electricity amount EPG_PV increases. Incidentally, the coefficient K may be a constant number or may vary depending on conditions such as the time of the day, the time of the year, and the weather.

The control portion 12 calculates a sales electricity amount EPS_PV by multiplying the generated electricity amount EPG_PV by the calculated electricity sales ratio RT_EPS (STEP 7). The sales electricity amount EPS_PV, which is an amount of electricity that the electricity generation portion 10 supplies to the electricity system in the control time, is not smaller than 0.

If the control portion 12 detects that an electricity amount (an amount of electricity that can be consumed by the load portion 11) calculated by subtracting the sales electricity amount EPS_PV from the generated electricity amount EPG_PV is larger than the target load electricity consumption amount C_LD_TG (STEP 8, YES), the control portion 12 calculates, as a secondary load electricity consumption amount C_LD2, an electricity amount by subtracting the sales electricity amount EPS_PV from the generated electricity amount EPG_PV (STEP 9).

On the other hand, if the control portion 12 detects that the electricity amount calculated by subtracting the sales electricity amount EPS_PV from the generated electricity amount EPG_PV is not larger than the target load electricity consumption amount C_LD_TG (STEP 8, NO), the control portion 12 calculates the primary load electricity consumption amount C_LD1 as the secondary load electricity consumption amount C_LD2 (STEP 10).

If the control portion 12 detects that the control time is in the low-price time period (from 17:00 to 7:00) (STEP 11, YES), the control portion 12 calculates, as a load electricity consumption amount C_LD, an electricity amount by adding a previously saved electricity amount EPSV_B to the secondary load electricity consumption amount C_LD2 (STEP 12). The previously saved electricity amount EPSV_B is at least one of (or part of accumulated) previously saved electricity amounts EPSV_A (which will be described in detail later) calculated in the hitherto performed control operations (which may include not only STEP 1 to STEP 16 performed in the current (present-day) control operation but also STEP 1 to STEP 16 performed in the previous control operations (performed in the previous day or earlier)), and the previously saved electricity amount EPSV_B is not smaller than 0.

On the other hand, if the control portion 12 detects that the control time is not in the low-price time period (from 17:00 to 7:00) (STEP 11, NO), the control portion 12 calculates the secondary load electricity consumption amount C_LD2 as the load electricity consumption amount C_LD (STEP 13).

The control portion 12 calculates a saved electricity amount EPSV_A by subtracting the load electricity consumption amount C_LD from the primary load electricity consumption amount C_LD1 (STEP 14). However, if the saved electricity amount EPSV_A is smaller than 0, the calculation is performed assuming that EPSV_A is 0. The saved electricity amount EPSV_A is later included, as the previously saved electricity amount EPSV_B, in the load electricity consumption amount C_LD. As a result, for example, the timing for a predetermined load included in the load portion 11 to operate (the timing for the load portion 11 to operate by consuming the saved electricity amount EPSV_A) is shifted (postponed) into the low-price time period.

The control portion 12 calculates a purchase electricity amount EPB, which is an amount of electricity that is supplied from the electricity system in the control time, by subtracting from the load electricity consumption amount C_LD a value obtained by subtracting the sales electricity amount EPS_PV from the generated electricity amount EPG_PV (STEP 15).

The control portion 12 so controls the electricity generation portion 10 and the load portion 11 in the control time as to achieve the sales electricity amount EPS_PV, the load electricity consumption amount C_LD, and the purchase electricity amount EPB which are calculated in the above-described manner. When the control of the electricity generation portion 10 and the load portion 11 in the control time is finished, the control portion 12 increases the variable t by 1 (STEP 16). Then, the control portion 12 returns to STEP 3, to check whether or not the predetermined amount of control time has passed.

Figure 5:
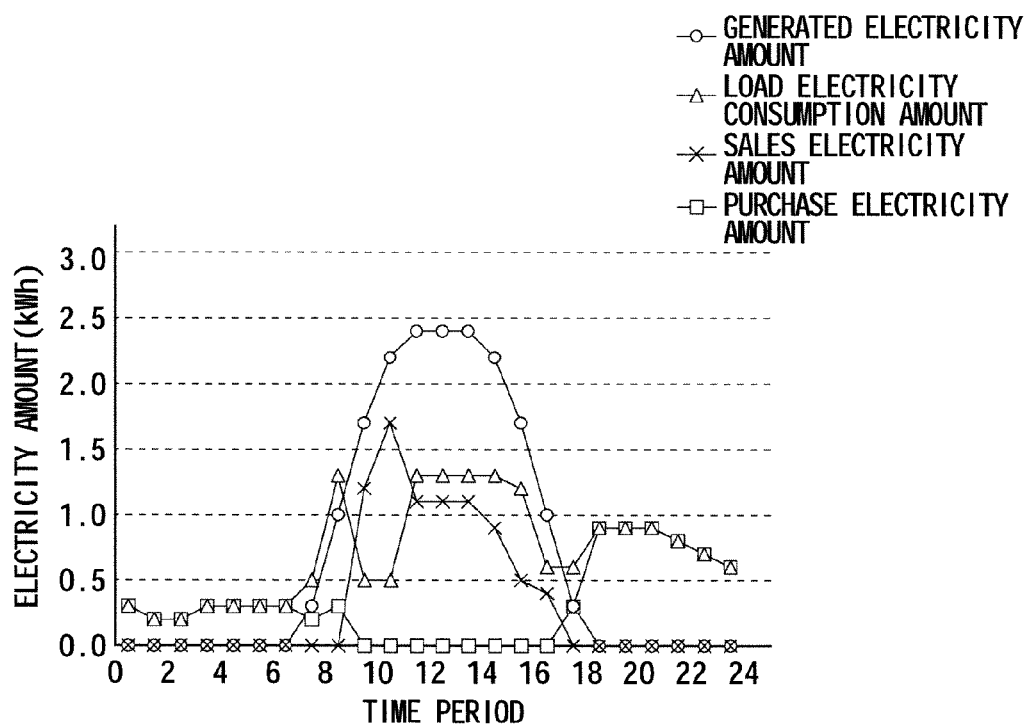
FIG. 5 is a graph showing the operation result shown in FIG. 4.
Figure 7:
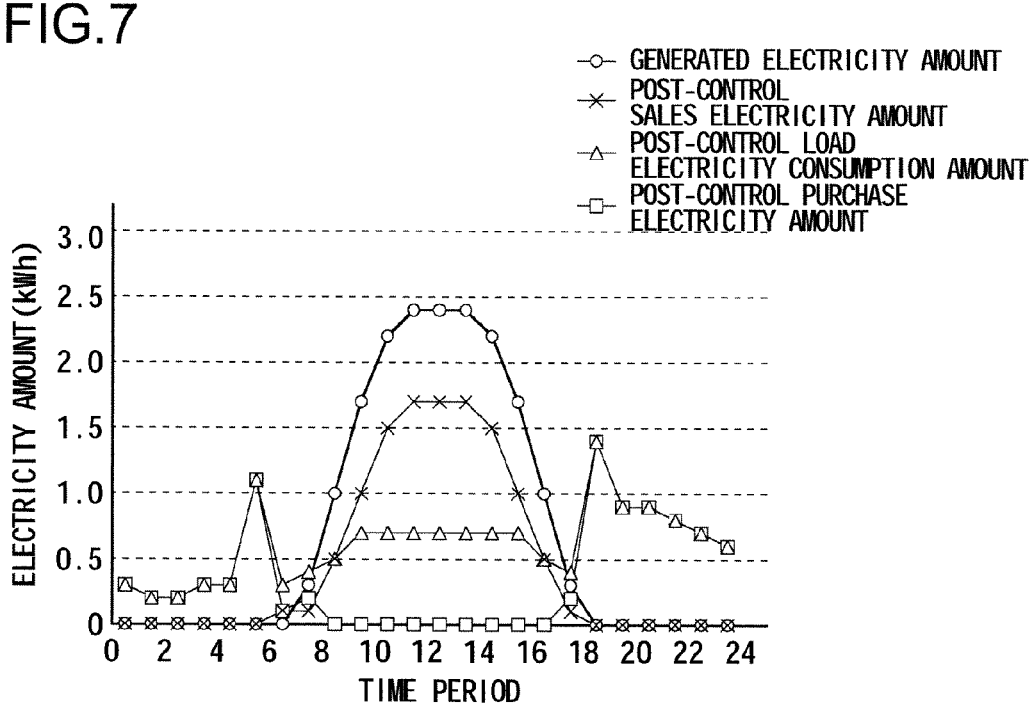
FIG. 7 is a graph showing the operation result shown in FIG. 6.
Figure 8:
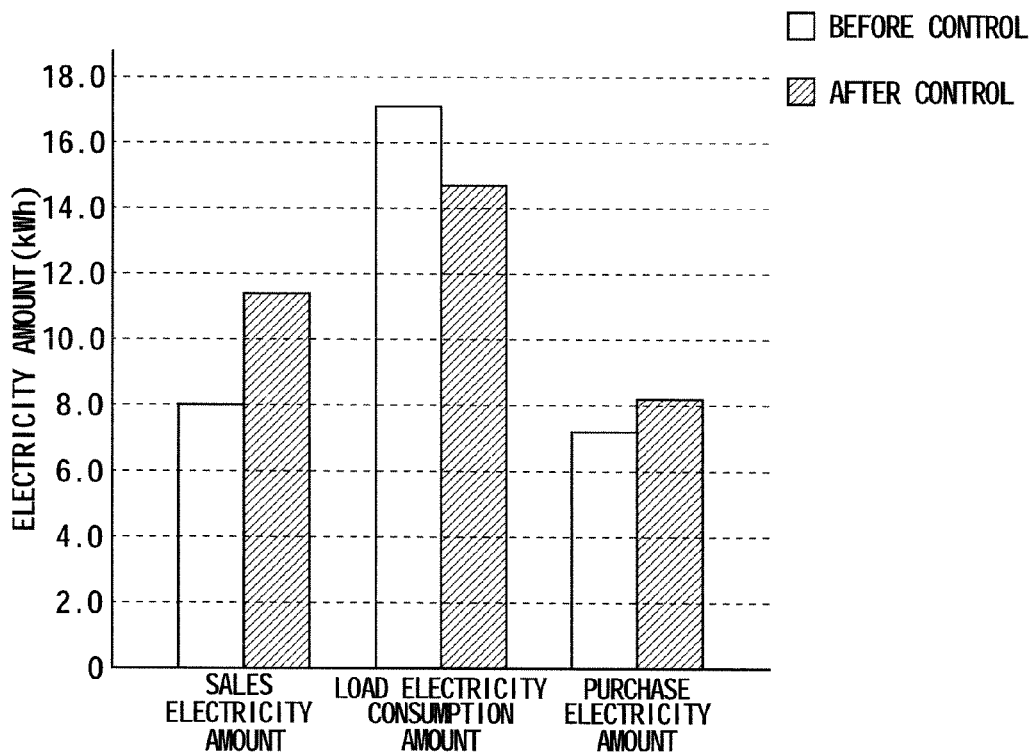
FIG. 8 is a graph showing the comparison between the operation results shown in the tables of FIGS. 4 and 6.

Descriptions will be given of variation in sales electricity amount, load electricity consumption amount, and purchase electricity amount caused by the control shown in FIG. 3, dealing with specific examples before and after the control, and referring to the accompanying drawings. FIG. 4 is a table showing an example of an operation result before the control shown in FIG. 3. FIG. 5 is a graph showing the operation result shown in FIG. 4. FIG. 6 is a table showing an example of an operation result after the control shown in FIG. 3, and FIG. 6 corresponds to FIG. 4 which shows an operation result before the control. FIG. 7 is a graph showing the operation result shown in FIG. 6, and FIG. 7 corresponds to FIG. 5 which shows the operation result before the control. FIG. 8 is a graph showing comparison between the operation results shown in the tables of FIGS. 4 and 6. Note that the tables and graphs of FIGS. 4 to 7 show the generated electricity amount, the load electricity consumption amount, the sales electricity amount, the purchase electricity amount, and the saved electricity amount, each indicated on an hourly basis.

In FIG. 4 and FIG. 5 (before the control shown in FIG. 3 is performed), it was assumed that the sales electricity amount was obtained by subtracting the amount of electricity consumed by the load portion 11 from the amount of electricity generated and supplied by the electricity generation portion 10. If the value of the thus obtained sales electricity amount was negative, the value was replaced with 0. On the other hand, the purchase electricity amount was obtained by subtracting the amount of electricity generated and supplied by the electricity generation portion 10 from the amount of electricity consumed by the load portion 11. However, if the value of the thus obtained purchase electricity amount was negative, the value was replaced with 0. To put the above in another way, if the amount of electricity generated and supplied by the electricity generation portion 10 was larger than the amount of electricity consumed by the load portion 11, the excess amount of electricity was sold, and if the amount of electricity generated and supplied by the electricity generation portion 10 was smaller than the amount of electricity consumed by the load portion 11, electricity was purchased to cover the deficiency. In this case, the selling and purchasing of electricity were not performed simultaneously.

Hereinafter, descriptions will be given, with comparison between FIGS. 4 and 5 (before the control) and FIGS. 6 and 7 (after the control), and with reference to FIG. 8. First, referring to all the time periods in FIGS. 4 and 6, and FIG. 8, the total sales electricity amount was 8.0 kWh before the control, but after the control, it increased to 11.4 kWh. On the other hand, the total purchase electricity amount was 7.2 kWh before the control, but after the control, it increased to 8.2 kWh. Such increase in sales electricity amount and such increase in purchase electricity amount can be caused by the control portion 12 determining the purchase electricity amount after securing the sales electricity amount.

Likewise, referring to all the time periods in FIGS. 4 and 6, and FIG. 8, the total load electricity consumption amount was 17.1 kWh before the control, but after the control, it decreased to 14.7 kWh. Such decrease in load electricity consumption amount can be caused by the control portion 12 controlling the operation of a load (for example, reducing the output of an air conditioner) after setting the target load electricity consumption amount.

Furthermore, referring to the time period of 15:00-16:00 in each of FIGS. 4 to 7, the load electricity consumption amount was 1.2 kWh before the control and 0.7 kWh after the control (that is, the saved electricity amount was 0.5 kWh). Moreover, referring to the time period of 18:00-19:00, the load electricity consumption amount was 0.9 kWh before the control, and 1.4 kWh after the control (that is, the previously saved electricity amount of 0.5 kWh was consumed). Such variations can be caused by the control portion 12 making a load (for example, a dish washer) having been scheduled to operate from 15:00 to 16:00 before the control, operate from 18:00 to 19:00 which is in the low-price time period.

Likewise, referring to the time period of 8:00-9:00 in each of FIGS. 4 to 7, the load electricity consumption amount was 1.3 kWh before the control and 0.5 kWh after the control (the saved electricity amount was 0.8 kWh). Furthermore, referring to the time period of 5:00-6:00, the load electricity consumption amount was 0.3 kWh before the control and 1.1 kWh after the control (that is, the previously saved electricity amount of 0.8 kWh was consumed). Such variations can be caused by the control portion 12 making a load (for example, a clothes washer) having been programmed to operate from 8:00 to 9:00 before the control, operate on the following day (this is construable as "on the same day") from 5:00 to 6:00 which is in the low-price time period.

Figures 9, 10:
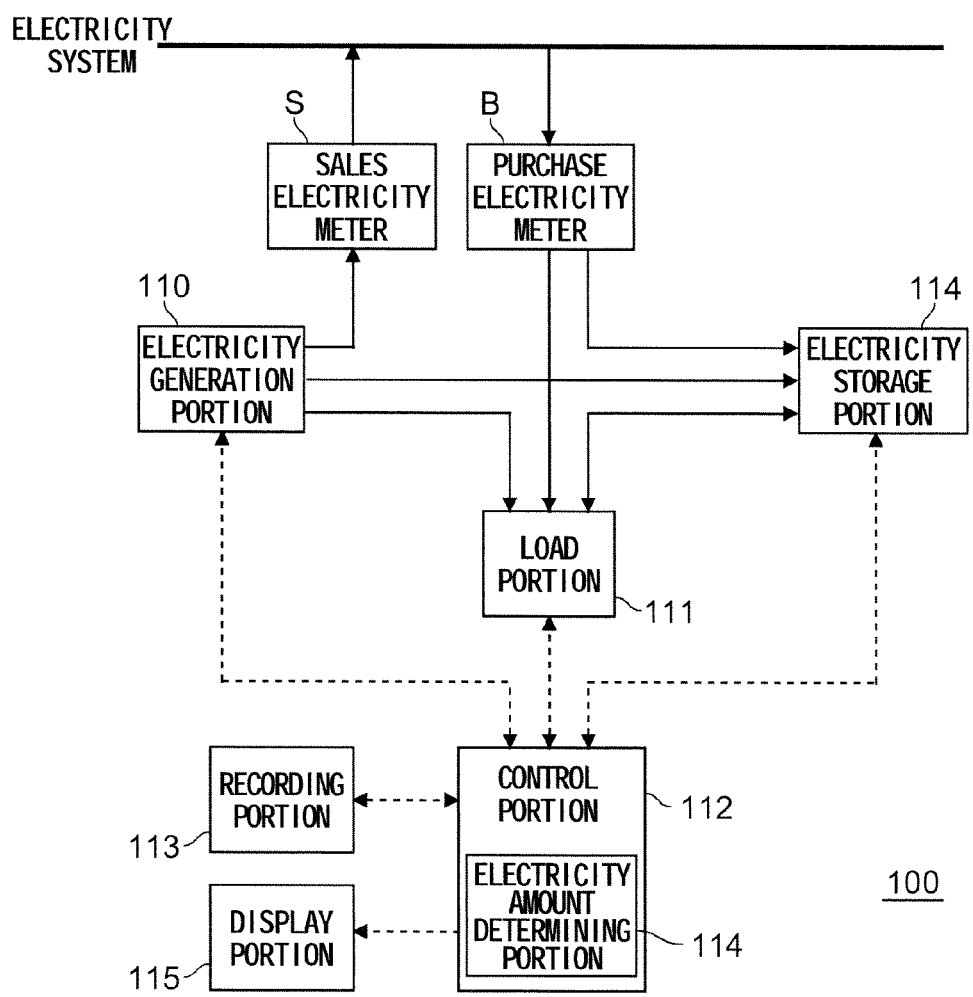
FIG. 9 is a table showing the comparison between cost advantage derived from the operation result shown in the table of FIG. 4 and cost advantage derived from the operation result shown in the table of FIG. 6.
FIG. 10 is a block diagram showing a configuration example of an electricity supply system according to a second embodiment of the present invention.

Now, a description will be given of cost advantages achieved by using the electricity supply system 1 of the first embodiment before and after the control shown in FIG. 3, with reference to FIG. 9. FIG. 9 is a table showing comparison between the cost advantage derived from the operation result shown in the table of FIG. 4 and the cost advantage derived from the operation result shown in the table of FIG. 6. The cost advantage in this example is a difference obtained by subtracting the cost of the system electricity supplied (purchased) from the electricity system (purchase electricity value) from the value of the electricity supplied (sold) to the electricity system (sales electricity value).

As shown in FIG. 9, the sales and purchase electricity values were both higher after the control than before the control. Furthermore, the increase in the sales electricity value after the control was greater than the increase in the purchase electricity value. Thus, the cost advantage after the control was larger than the cost advantage before the control.

With the above configuration, the control portion 12 controls the electricity generation portion 10 and the load portion 11 based on the values of the plurality of electricities that the electricity supply system 1 deals with. This makes it possible to make effective use of electricity.

In particular, the amounts of the various electricities (for example, the electricity consumed by the load portion 11, the system electricity, and the like) that the electricity supply system deals with can be determined, with priority given to an electricity whose per-unit value is high (the electricity that the electricity generation portion 12 supplies to the electricity system). This makes it possible to make more effective use of electricity.

Furthermore, the control portion 12 secures the amount of the electricity to be supplied (sold) to the electricity system and then determines amounts of the other electricities. This makes it possible to increase the cost advantage achieved by the electricity supply system 1, and thus to expect achievement of widespread use of the electricity supply system 1. And, by achieving the widespread use of the electricity supply system 1, it is possible to reduce $CO_2$ emission from electric power companies which generate electricity (in particular, by thermal electricity generation), and to expect problems such as global warming to be solved.

Also, by the control portion 12 so controlling as to make the load portion 11 perform an operation having been scheduled to be performed in the high-price period in the low-price period, even if the system electricity is necessary to make the load portion 11 operate, it is possible to reduce the cost for buying the system electricity.

In a case where the control portion 12 determines the timing to operate a predetermined load included in the load portion 11 to consume the previously saved electricity amount EP SV_B, it is preferable to take into consideration noise made when the load is operated, the life style of a user (for example, the timing when the operation of the load should be finished), and the like. The control portion 12 may present the user with possible timings for starting the operation of the load such that the user can decide when to start.

<<Second Embodiment>>
<Configuration Example of Electricity Supply System>

Next, a description will be given of a configuration example of an electricity supply system according to a second embodiment of the present invention, with reference to FIG. 10. FIG. 10 is a diagram showing the configuration example of the electricity supply system according to the second embodiment of the present invention, and corresponds to FIG. 1 illustrating the first embodiment.

As shown in FIG. 10, an electricity supply system 100 includes an electricity generation portion 110, a load portion 111, a control portion 112, a recording portion 113, and an electricity storage portion 114 which is charged by consuming supplied electricity and discharges to supply electricity.

The electricity generation portion 110 is similar to the electricity generation portion 10 (see FIG. 1) described in the first embodiment, except that the electricity generation portion 110 is capable of supplying electricity not only to the load portion 111 and the electricity system, but also to the electricity storage portion 114, and thus a detailed description thereof will be omitted. Likewise, the load portion 111 is similar to the load portion 11 (see FIG. 1) described in the first embodiment, except that the load portion 111 is capable of consuming not only the system electricity and electricity supplied from the electricity generation portion 110, but also electricity supplied from the electricity storage portion 114, and thus a detailed description thereof will be omitted.

The control portion 112 is different from the control portion 12 (see FIG. 1) described in the first embodiment in that the control portion 112 is capable of controlling not only the operations of the electricity generation portion 110 and the load portion 111 but also the operation of the electricity storage portion 114. The control portion 112 is further different from the control portion 12 (see FIG. 1) described in the first embodiment in that the control portion 112 is capable of acquiring not only information indicating electricity that the electricity generation portion 110 generates and supplies from the electricity generation portion 110 and information indicating electricity that the load portion 111 consumes from the load portion 111, but also information indicating electricity that the electricity storage portion 114 is charged with and discharges and information indicating an amount of electricity that the electricity storage portion 114 is able to discharge (hereinafter, remaining capacity from the electricity storage portion 114. In features other than these, the control portion 112 of the second embodiment is similar to the control portion 12 described in the first embodiment, and thus, a detailed description thereof will be omitted.

The recording portion 113 is similar to the recording portion 13 (see FIG. 1) described in the first embodiment, and thus, a detailed description thereof will be omitted.

The electricity storage portion 114 is formed of a high-capacity storage battery; the electricity storage portion 114 is charged with electricity by properly converting electricity supplied thereto (for example, converting AC electricity to DC electricity), and supplies electricity to the load portion 111 by properly converting the electricity it has been charged with (for example, converting DC electricity to AC electricity). Furthermore, the electricity storage portion 114 estimates the remaining capacity thereof by measuring the amount of electricity or current with which the electricity storage portion 114 is charged and discharges, and/or by being provided with a table indicating a relationship between the voltage value and the remaining capacity of the electricity storage portion and measuring the voltage value of the electricity storage portion 110 to check the measured voltage value against values in the table. Instead of (or, in addition to) the electricity storage portion 110, the control portion 112 may estimate the remaining capacity of the electricity storage portion 114.

The amount of electricity that the electricity generation portion 110 supplies to the electricity system is measured by a sales electricity meter S, and reported to the electricity company that manages the electricity system. The amount of system electricity consumed by the load portion 111 and the electricity storage portion 114 is measured by a purchase electricity meter B, and reported to the electricity company that manages the electricity system.

<Examples of how Control Portion Controls Electricity Generation Portion, Load Portion, and Electricity Storage Portion>

Figure 11:
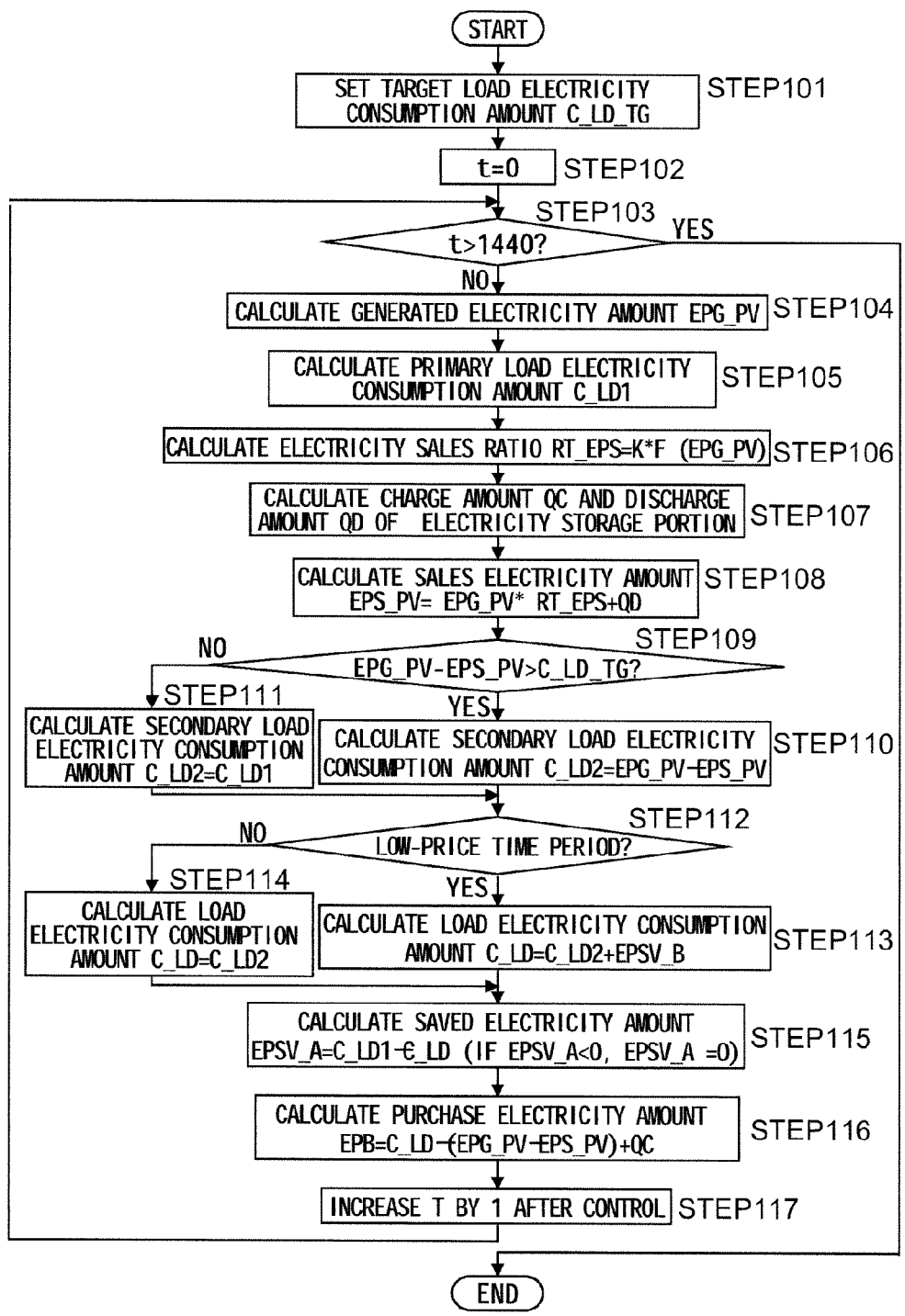
FIG. 11 is a flow chart showing an example of the method of controlling an electricity generation portion, a load portion, and an electricity storage portion performed by a control portion provided in the electricity supply system according to the second embodiment of the present invention.

Next, details of how the control portion 112 controls the electricity generation portion 110, the load portion 111, and the electricity storage portion 114 will be described referring to the accompanying drawings, and dealing with specific examples. FIG. 11 is a flow chart showing an example of the method of controlling the electricity generation portion, the load portion, and the electricity storage portion performed by the control portion provided in the electricity supply system according to the second embodiment of the present invention, and FIG. 11 corresponds to FIG. 3 illustrating the first embodiment.

In the electricity supply system 100 of the second embodiment as well, the electricity sales rate and the electricity purchase rate are as shown in the table of FIG. 2. However, the electricity supply system 100 of the second embodiment includes not only a solar photovoltaic power generating unit (the electricity generation portion 110), but also power generation-related equipment (the electricity storage portion 114) and the like, the electricity sales rate is 39 yen/kWh. Incidentally, the electricity purchase rate is the same as in the first embodiment, and thus a detailed description thereof will be omitted.

As shown in FIG. 11, the control portion 112 first sets a target load electricity consumption amount C_LD_TG (STEP 101), sets a variable t to 0 (STEP 102), and checks whether or not a predetermined amount of control time (for example, 1440 minutes=one day) has passed (STEP 103). The control portion 112 calculates a generated electricity amount EPG_PV (STEP 104), and also calculates a primary load electricity consumption amount C_LD1 (STEP 105). The control portion 112 also calculates an electricity sales ratio RT_EPS (STEP 106). Incidentally, these operations (STEP 101-STEP 106) are similar to those of STEP 1-STEP 6 (see FIG. 3) of the first embodiment, and thus detailed descriptions thereof will be omitted.

Next, the control portion 112 calculates a charge amount QC, which is an amount of electricity consumed to charge the electricity storage portion 114 in a control time, and a discharge amount QD, which is an amount of electricity supplied by discharge of the electricity storage portion 114 in the control time (STEP 107). The charge amount QC is positive (that is, the electricity storage portion 114 is charged), for example, at least in part of the low-price period, and is 0 (that is, the electricity storage portion 114 is not charged) in the high-price period. The discharge amount QD is positive (that is, the electricity storage portion 114 is discharged), for example, at least in part of the high-price period, and is 0 (that is, the electricity storage portion 114 is not discharged) in the low-price period.

The control portion 112 calculates a sales electricity amount EPS_PV by multiplying an generated electricity amount EPG_PV by the calculated electricity sales ratio RT_EPS, and adding the discharge amount QD (STEP 108).

The control portion 112 checks whether or not an electricity amount calculated by subtracting the sales electricity amount EPS_PV from the generated electricity amount EPG_PV is larger than a target load electricity consumption amount C_LD_TG (STEP 109), and according to the result, the control portion 12 calculates a secondary load electricity consumption amount C_LD2 (STEP 110 and STEP 111). The control portion 112 checks whether or not the control time is in the low-price period (STEP 112), and according to the result, the control portion 112 calculates a load electricity consumption amount (STEP 113 and STEP 114). The control portion 112 further calculates a saved electricity amount EPSV_A (STEP 115). Incidentally, these operations (STEP 109-STEP 115) are similar to STEP 8-STEP 14 (see FIG. 3) of the first embodiment, and thus detailed descriptions thereof will be omitted.

Furthermore, the control portion 112 calculates a purchase electricity amount EPB by subtracting from the load electricity consumption amount C_LD a value obtained by subtracting the sales electricity amount EPS_PV from the generated electricity amount EPG_PV, and adding the charge amount QC (STEP 116).

And, the control portion 112 so controls the electricity generation portion 110, the load portion 111, and the electricity storage portion 114 in the control time as to achieve the sales electricity amount EPS_PV, the charge amount QC, the discharge amount QD, the load electricity consumption amount C_LD, and the purchase electricity amount EPB, which are calculated in the above-described manner. The control portion 112 increases the variable t by 1 when it finishes controlling the electricity generation portion 110, the load portion 111, and the electricity storage portion 114 in the control time (STEP 117). And, the control portion 112 returns to STEP 103 to check whether or not the predetermined amount of control time has passed.

Descriptions will be given of variation in the sales electricity amount, the load electricity consumption amount, and the purchase electricity amount caused by the control shown in FIG. 11, dealing with specific examples before and after the control, and referring to the accompanying drawings. FIG. 12 is a table showing an example of an operation result before the control shown in FIG. 11 is performed. FIG. 13 is a table showing the operation result shown in FIG. 11, and corresponds to FIG. 12 which shows the operation result before the control is performed. Note that the tables of FIGS. 12 and 13 each show the generated electricity amount, the charge amount, the discharge amount, the load electricity consumption amount, the sales electricity amount, the purchase electricity amount, and the saved electricity amount, each indicated on an hourly basis. In the operation result examples shown in FIG. 12 and FIG. 13, it was assumed that a maximum value of the remaining capacity (capacity) of the electricity storage portion 114 was 2.5 kWh.

In FIG. 12 (before the control shown in FIG. 11 is performed), the sales electricity amount was obtained by adding the amount of electricity discharged and supplied from the electricity storage portion 114 and subtracting the amount of electricity consumed by the load portion 111 to and from the amount of electricity that the electricity generation portion 110 generates and supplies. If the value of the thus obtained sales electricity amount was negative, the value was replaced with 0. On the other hand, the purchase electricity amount was obtained by adding the amount of electricity consumed to charge the electricity storage portion 114 and subtracting the amount of electricity generated and supplied from the generation portion 110 to and from the amount of electricity consumed by the load portion 111. However, if the value of the thus obtained purchase electricity amount was negative, the value was replaced with 0. To put the above in another way, if the amount of electricity generated and supplied by the electricity generation portion 110 was larger than the amount of electricity consumed by the load portion 111 and the electricity storage portion 114, the excess amount of electricity was sold, and if the amount of electricity generated and supplied by the electricity generation portion 110 was smaller than the amount of electricity consumed by the load portion 111 and the electricity storage portion 114, electricity was purchased to cover the deficiency. In this case, the selling and buying of electricity were not performed simultaneously.

Descriptions will be given below, comparing FIG. 12 (before the control) and FIG. 13 (after the control). First, referring to the entire time periods in FIGS. 12 and 13, the total sales electricity amount was 10.2 kWh before the control, but after the control, it increased to 13.9 kWh. On the other hand, the total purchase electricity amount was 9.4 kWh before the control, but after the control, it increased to 10.5 kWh. The sales electricity amount and the purchase electricity amount increased as in the first embodiment.

However, the control portion 112 of the second embodiment controlled the charging and discharging of the electricity storage portion 114 to increase the purchase electricity amount and the sales electricity amount. Thus, after the control, the purchase electricity amount (10.5 kWh) and the sales electricity amount (13.9 kWh) of the electricity supply system 100 of the second embodiment were larger than the purchase electricity amount (8.2 kWh) and the sales electricity amount (11.4 kWh) of the electricity supply system 1 of the first embodiment.

Referring to the entire time periods in FIGS. 12 and 13, the total of the load electricity consumption amount was 17.1 kWh before the control, but after the control, it decreased to 14.7 kWh. The load electricity consumption amount decreased as in the first embodiment.

Furthermore, referring to the time period of 15:00-16:00 in each of FIGS. 12 and 13, the load electricity consumption amount was 1.2 kWh before the control, and 0.7 kWh after the control (that is, the saved electricity amount was 0.5 kWh). Moreover, referring to the time period of 18:00-19:00, the load electricity consumption amount was 0.9 kWh before the control, and 1.4 kWh after the control (that is, the previously saved electricity amount of 0.5 kWh was consumed). These amounts varied between before and after the control as in the first embodiment.

Likewise, referring to the time period of 8:00-9:00 in each of FIGS. 12 and 13, the load electricity consumption amount was 1.3 kWh before the control and 0.5 kWh after the control (that is, the saved electricity amount was 0.8 kWh). Moreover, referring to the time period of 5:00-6:00, the load electricity consumption amount was 0.3 kWh before the control, and 1.1 kWh after the control (that is, the previously saved electricity amount of 0.8 kWh was consumed). These amounts varied between before and after the control as in the first embodiment.

Now, a description will be given of cost advantages achieved by using the electricity supply system 100 of the second embodiment before and after the control shown in FIG. 11, with reference to FIG. 14. FIG. 14 is a table showing comparison between the cost advantage derived from the operation result shown in the table of FIG. 12 and the cost advantage derived from the operation result shown in the table of FIG. 13. The cost advantages in this example were similar to those dealt with in the description referring to FIG. 9.

As shown in FIG. 14, the sales and purchase electricity values were both greater after the control than before the control. Further, the increase in the sales electricity value after the control was greater than the increase in the purchase electricity value. Thus, the cost advantage after the control was larger than the cost advantage before the control. In this respect, this embodiment is similar to the first embodiment.

Thus, with the electricity supply system 100 of the second embodiment, it is possible to obtain the same effect as can be obtained with the electricity supply system 1 of the first embodiment. Furthermore, with the electricity supply system 100 of the second embodiment, by the control portion 112 controlling the charging and discharging of the electricity storage portion 114, it is possible to secure the amount of electricity that the electricity generation portion 110 supplies to the electricity system. This makes it possible to make more effective use of electricity.

In the operation result examples shown in FIGS. 12 and 13, the electricity storage portion 114 was charged until the remaining capacity thereof was substantially equal to the capacity thereof and the electricity storage portion 114 was discharged until the remaining capacity thereof was substantially equal to 0 in one control operation (one day), but the charging and discharging of the electricity storage portion 114 may be performed in a plurality of control operations (for example, one week). Or, the charging and discharging of the electricity storage portion 114 may be performed a plurality of times in one control operation. Besides, the electricity storage portion 114 does not need to be charged until the remaining capacity is substantially equal to the capacity thereof, or, the electricity storage portion 114 does not need to be discharged until the remaining capacity thereof is substantially 0, either.

In a case where the control portion 112 determines the timing to operate a predetermined load included in the load portion 11 to consume the previously saved electricity amount EPSV_B, it is preferable to take into consideration noise made when the load is operated, the life style of a user (for example, the timing when the operation of the load should be finished), and the like. Or, the control portion 112 may present the user with possible timings of starting the operation of the load such that the user can decide when to start.

<<Third Embodiment>>

<Configuration Example of Electricity Supply System>

Next, a description will be given of an electricity supply system according to a third embodiment of the present invention, with reference to the accompanying drawings. The configuration of the electricity supply system of the third embodiment is similar to that of the electricity supply system of the second embodiment, and thus, it is assumed that FIG. 10 also shows the configuration of the electricity supply system of the third embodiment, and a detailed description thereof will be omitted.

<Examples of how Control Portion Controls Electricity Generation Portion, Load Portion, and Electricity Storage Portion>

Figure 16:
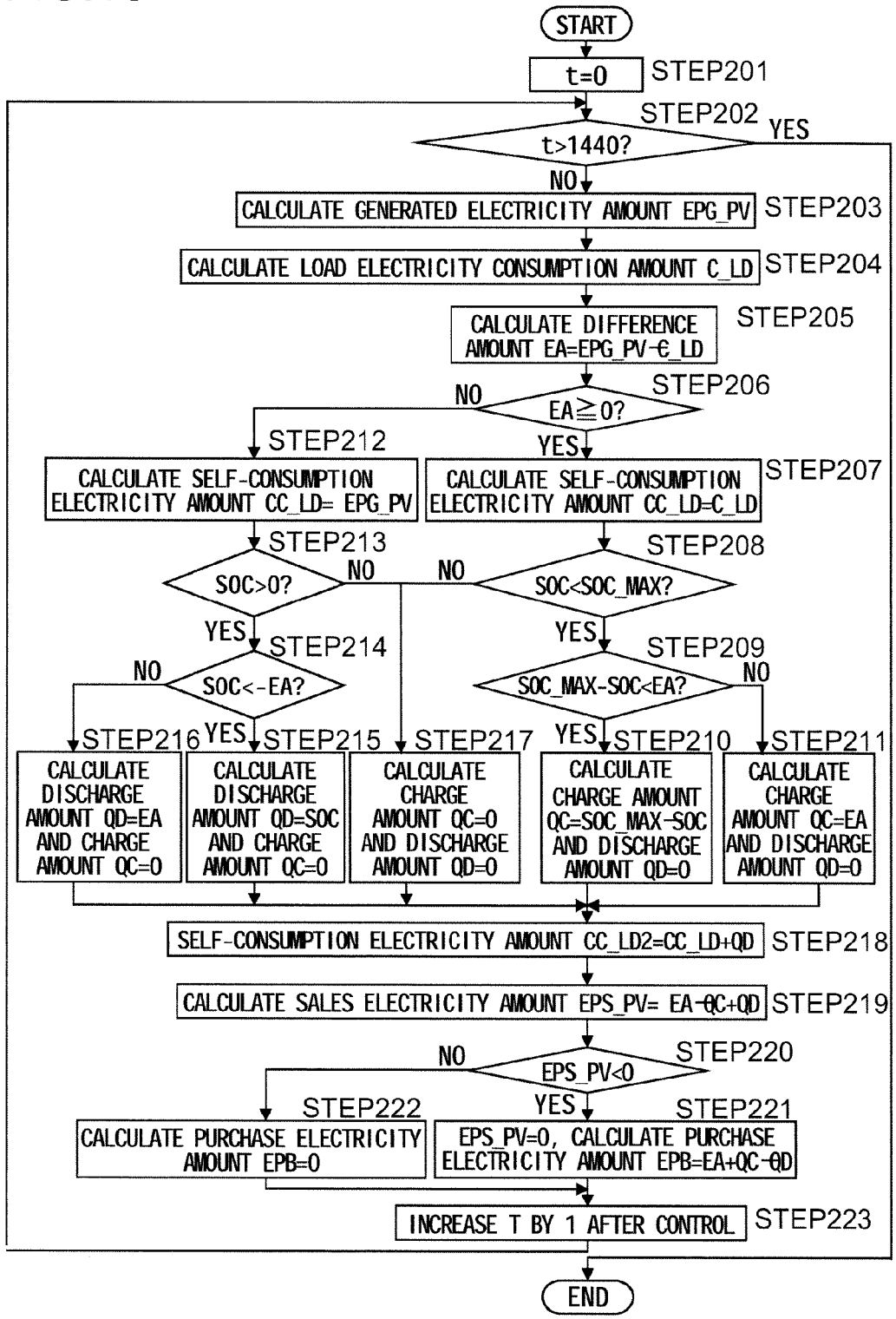
FIG. 16 is a flow chart showing an example of the method of controlling an electricity generation portion, a load portion, and an electricity storage portion performed by a control portion provided in an electricity supply system according to a third embodiment of the present invention.

Details of how the control portion 112 controls the electricity generation portion 110, the load portion 111, and the electricity storage portion 114 will be described referring to the accompanying drawings and dealing with specific examples. FIG. 15 is a table showing examples of the electricity sales rate and the environmental added value rate (first to third patterns). FIG. 16 is a flow chart showing an example of the method of controlling the electricity generation portion, the load portion, and the electricity storage portion performed by the control portion provided in the electricity supply system according to the second embodiment of the present invention, and FIG. 16 corresponds to FIG. 3 illustrating the first embodiment.

The environmental added value rate may be set for the purpose of promoting consumption of the electricity generated by generation within the electricity supply system 100 within the electricity supply system 100 (to prevent a large amount of electricity from being supplied from a large number of electricity supply systems to the electricity system in a case where the electricity supply systems have spread sufficiently) by, for example, governments, local public entities, electricity-related private associations, or the like. In this example, the environmental added value is a value added to a unit amount of electricity that the electricity generation portion 110 generates and supplies and that is consumed by the load 111 (hereinafter, a self-consumption electricity amount). The self-consumption electricity amount includes electricity that is generated and once charged into an LIB and then discharged to be supplied to a load at a time different from the time when the electricity is generated. Furthermore, from the viewpoint of saving energy, there may be set a limit to the self-consumption electricity amount to which the environmental added value is added; however, for a simple description, it is assumed that such a limit is not set.

Besides, for specific descriptions, it is assumed hereinafter that the electricity sales rate and the environmental added value rate are values of one of the first to third patterns shown in FIG. 15. In the first pattern, the electricity sales rate is 24 yen/kWh, and the environmental added value rate is 5 yen/kWh. In the second pattern, the electricity sales rate is 12 yen/kWh, and the environmental added value rate is 5 yen/kWh. In the third pattern, the electricity sales rate is 6 yen/kWh, and the environmental added value rate is 10 yen/kWh. The electricity purchase rate is as shown in FIG. 2, and thus, a detailed description thereof will be omitted.

As shown in FIG. 16, the control portion 112 first sets a variable t to 0 (STEP 201), and checks whether or not a predetermined amount of control time (for example, 1440 minutes=one day) has passed (STEP 202). The control portion 112 also calculates an generated electricity amount EPG_PV (STEP 203). Incidentally, these operations (STEP 201-STEP 203) are similar to those of STEP 2-STEP 4 (see FIG. 3) of the first embodiment, and thus detailed descriptions thereof will be omitted.

The control portion 112 also calculates a load electricity consumption amount C_LD (STEP 205). For example, the control portion 12 calculates the load electricity consumption amount C_LD by acquiring from the load portion 11 information indicating an amount of electricity that the load portion 11 consumes.

Next, the control portion 112 calculates a difference amount EA by subtracting the load electricity consumption amount C_LD from the generated electricity amount EPG_PV (STEP 205). If the difference amount EA is 0 or larger (STEP 206, YES), the control portion 112 calculates a self-consumption electricity amount CC_LD as the load electricity consumption amount C_LD (STEP 207). In this case, the load electricity consumption amount C_LD is covered with part of or all of the generated electricity amount EPG_PV.

Furthermore, if a remaining capacity SOC of the electricity storage portion 114 is smaller than a maximum value SOC_MAX (STEP 208, YES), and a value (specifically, an amount of electricity that can be charged into the electricity storage portion 114) obtained by subtracting the remaining capacity SOC from the maximum value SOC_MAX is smaller than the difference amount EA (STEP 209, YES), the control portion 112 calculates the charge amount QC as a value obtained by subtracting the remaining capacity SOC from the maximum value SOC_MAX. At the same time, the control portion 112 calculates the discharge amount QD as 0 (STEP 210).

In contrast, if the remaining capacity SOC of the electricity storage portion 114 is smaller than the maximum value SOC_MAX (STEP 208, YES), and the value obtained by subtracting the remaining capacity SOC from the maximum value SOC_MAX is not smaller than the difference amount EA (STEP 209, NO), the control portion 112 calculates the charge amount QC as 0 (STEP 211). At the same time, the control portion 112 calculates the discharge amount QD as 0 (STEP 211).

On the other hand, if the difference amount EA is smaller than 0 (STEP 206, NO), the control portion 112 calculates the self-consumption electricity amount CC_LD as the generated electricity amount EPG_PV (STEP 212). In this case, the self-consumption electricity amount CC_LD is covered with all of the generated electricity amount EPG_PV.

Furthermore, if the remaining capacity SOC of the electricity storage portion 114 is larger than 0 (STEP 213, YES), and the remaining capacity SOC is smaller than the absolute value (−EA) of the difference amount EA (STEP 214, YES), the control portion 112 calculates the discharge amount QD as the remaining capacity SOC. At the same time, the control portion 112 calculates the charge amount QC as 0 (STEP 215).

In contrast, if the remaining capacity SOC of the electricity storage portion 114 is larger than 0 (STEP 213, YES) and the remaining capacity SOC is not smaller than the absolute value (−EA) of the difference amount EA (STEP 214, NO), the control portion 112 calculates the discharge amount QD as the absolute value (−EA) of the difference amount EA. At the same time, the control portion 112 calculates the charge amount QC as 0 (STEP 216).

Now, if the difference amount EA is not smaller than 0 and the remaining capacity is equal to the maximum value SOC_MAZ (STEP 207, NO), or if the difference amount EA is smaller than 0, and the remaining capacity SOC is equal to 0 (STEP 213, NO), the control portion 112 calculates both the charge amount QC and the discharge amount QD as 0 (STEP 217).

The control portion calculates a self-consumption electricity amount CC_LD2 as an amount of electricity obtained by adding to the CC_LD an electricity amount QD resulting from charging a surplus of an amount of electricity generated by solar photovoltaic power generation into a storage battery (STEP 218).

Next, the control portion 112 calculates a sales electricity amount EPG_PV as a value obtained by subtracting the charge amount QC from the difference amount EA and adding the discharge amount QD to the difference amount EA (STEP 219).

If the sales electricity amount EPS_PV is smaller than 0 (STEP 220, YES), the control portion 112 calculates the sales electricity amount EPS_PV as 0 and calculates a purchase electricity amount EPB as a value obtained by adding the charge amount QC to a value obtained by inverting the sign of the difference amount EA (−EA) and subtracting therefrom the discharge amount QD (STEP 221).

On the other hand, if the sales electricity amount EPS_PV is not smaller than 0 (STEP 220, NO), the control portion 112 calculates the purchase electricity amount EPB as 0 (STEP 222).

And, the control portion 112 so controls the electricity generation portion 110, the load portion 111 and the electricity storage portion 114 in the control time as to achieve the self-consumption electricity amount CC_LD, the charge amount QC, the discharge amount QD, the sales electricity amount EPS_PV, and the purchase electricity amount EPB, which are calculated in the above-described manner. The control portion 112 increases the variable t by 1 when it finishes controlling the electricity generation portion 110, the load portion 111, and the electricity storage portion 114 in the control time (STEP 223). Then, the control portion 112 returns to STEP 202 to check whether or not the predetermined amount of control time has passed.

Descriptions will be given of variation in the sales electricity amount, the charge amount, the discharge amount, and the purchase electricity amount caused by the control shown in FIG. 16, dealing with specific examples before and after the control and referring to the accompanying drawings. FIG. 17 is a table showing an operation result example before the control shown in FIG. 16 is performed. FIG. 18 is a table showing the operation result shown in FIG. 16, and corresponds to FIG. 17 which shows the operation result before the control is performed. FIG. 19 is a table showing part of the controlling method shown in FIG. 16. Note that the tables of FIGS. 17 and 18 each show the generated electricity amount, the load electricity consumption amount, the self-consumption electricity amount, the charge amount, the discharge amount, the remaining capacity, the sales electricity amount, and the purchase electricity amount, each indicated on an hourly basis. In the operation result examples shown in FIG. 17 and FIG. 18, it was assumed that a maximum value of the remaining capacity (capacity) of the electricity storage portion 114 was 8 kWh.

Furthermore, for continuous indication of the charging and discharging of the electricity storage portion 114, in the tables shown in FIGS. 17 and 18, the top row is for the period 7:00-8:00, which is different from the tables for the other embodiments (FIGS. 4 and 6, and FIGS. 12 and 13). However, FIG. 17 (before the control shown in FIG. 16 is preformed) is the same as FIG. 4 (before the control shown in FIG. 3 is performed) which has been referred to in the description of the first embodiment. Thus, a detailed description of FIG. 17 will be omitted.

Descriptions will be given below, comparing FIG. 17 (before the control) and FIG. 18 (after the control). First, referring to the whole time periods in FIGS. 17 and 18, the total sales electricity amount before the control was 8.0 kWh, but after the control, decreased to 0 kWh. On the other hand, the total purchase electricity amount was 7.2 kWh before the control, but after the control, it decreased to 0.5 kWh. Such decrease in sales electricity amount and such decrease in purchase electricity amount can be caused by the control portion 12 controlling the charging and discharging of the electricity storage portion 114.

As shown in FIG. 19, when the difference amount EA is not smaller than 0 (9:00-17:00, 6:00-7:00), the control portion 112 sells electricity if the remaining capacity SOC of the electricity storage portion 114 is equal to the maximum value SOC_MAX (charging impossible), but if not, the control portion 112 charges the electricity storage portion 114. On the other hand, when the difference amount EA is negative (7:00-9:00, 18:00-6:00), the control portion 112 purchases electricity if the remaining capacity SOC of the electricity storage portion 114 is 0 (discharging impossible), but if not, the control portion 112 makes the electricity storage portion 114 discharge. That is, the control portion 112 controls the sales electricity amount and the purchase electricity amount, and controlled the electricity generation portion 110, the load portion 111, and the electricity storage portion 114 such that electricity is supplied and consumed within the electricity supply system 100.

Now, a description will be given of cost advantages before and after the control shown in FIG. 16, with reference to FIG. 20. FIG. 20 are tables related to the first to third patterns shown in FIG. 15, showing the comparison between the cost advantage derived from the operation result shown in the table of FIG. 17 and the cost advantage derived from the operation result shown in the table of FIG. 18, on a one-by-one basis of the first to third patterns shown in FIG. 5. The cost advantage achieved in this example is a difference obtained by subtracting the value (purchase electricity value) of system electricity, which is supplied (purchased) from the electricity system, from the sum of the value (sales electricity value) of electricity supplied (sold) to the electricity system and the value (environmental added value) added to the electricity that the electricity generation portion 110 supplies and the load portion 111 consumes.

As shown in FIG. 20, in the first pattern, the sales and purchase electricity values after the control were both smaller than the sales and purchase electricity values before the control, while the environmental added value was larger after the control than before the control. Furthermore, the decrease in the sales electricity value after the control was greater than the decrease in the purchase electricity value after the control. Thus, in the first pattern, the cost advantage was smaller after the control than before the control.

In the second pattern, where the electricity sales rate is lower than in the first pattern and the environmental added value rate is the same as in the first pattern, the sales and purchase electricity values were both smaller after the control than before the control, while the environmental added value was larger after the control than before the control. Furthermore, the decrease in the sales electricity value after the control was slightly smaller than the decrease in the purchase electricity value after the control. Thus, in the second pattern, the cost advantage after the control was larger than the cost advantage before the control.

In the third pattern, where the electricity sales rate is lower than in the second pattern and the environmental added value rate is larger than in the first and second patterns, the sales and purchase electricity values were both smaller after the control than before the control, while the environmental added value was larger after the control than before the control. Furthermore, the decrease in the sales electricity value after the control was smaller than the decrease in the purchase electricity value after the control. Thus, in the third pattern, the cost advantage after the control was larger than the cost advantage before the control.

Thus, it is preferable to adopt the control method shown in FIG. 16 in a case where the electricity sales rate is comparatively low, because the method contributes to a larger cost advantage.

For example, it is preferable to adopt the control method shown in FIG. 11 as the control method of the electricity supply system 100 of the second embodiment in a case where an evaluation value S obtained by subtracting the electricity purchase rate from the sum of the electricity sales rate and the environmental added value rate is not smaller than 0 (that is, when the value of electricity supplied (sold) to the electricity system is comparatively high), because the control method contributes to efficiently increasing the cost advantage. On the other hand, in a case where the evaluation value S is smaller than 0 (that is, when the value of electricity supplied (sold) to the electricity is comparatively low), it is preferable to adopt the control method shown in FIG. 16, because the control method contributes to efficiently increasing the cost advantage.

As described above, in the electricity supply system 100 of the third embodiment, the control portion 112 controls the electricity generation portion 110 and the load portion 111 based on the values of the plurality of electricities that the electricity supply system 100 deals with. This makes it possible to make effective use of electricity. In this respect, the electricity supply system 100 is similar to the electricity supply system 1 of the first embodiment.

Furthermore, by the control portion 112 controlling the charging and discharging of the electricity storage portion 114, it is possible to correct excess and deficiency in amount of electricity occurring between the electricity that the electricity generation portion 110 supplies and the electricity that the load portion 111 consumes. This makes it possible to make more effective use of electricity.

Besides, the control portion 112 changes the control method according to variation of the electricity values. With this configuration, even if the electricity values vary, the control portion 112 is able to control the electricity generation portion 110, the load portion 111, and the electricity storage portion 114 by an appropriate control method according to the varied electricity values.

In particular, by the control portion 112 changing the control method according to the evaluation value S, it is possible to first secure an amount of whichever of the electricity supplied (sold) to the electricity system by the electricity generation portion 110 and the electricity supplied to the load portion 114 by the electricity generation portion 110 that contributes more to the cost advantage than the other, and then determine the amounts of the other electricities. Thus, even if these electricity values vary, it is possible to make effective use of electricity.

Incidentally, when the control portion 112 calculates the charge amount QC and the discharge amount QD of the electricity storage portion 114 in STEP 210, STEP 221, STEP 215, and STEP 216 of FIG. 16, respectively, an upper limit value may be set for each of the amounts so as to prevent a large amount of electricity from being charged into the electricity storage portion 114 or discharged from the electricity storage portion 114.

In calculation of the evaluation value S, as to a rate (for example, the electricity purchase rate) that varies in a control operation of the control portion 112, an average of the various values of the rate may be used as the rate. Besides, the rate may be used as it is such that the evaluation value S varies in the control operation performed by the control portion 112. In this case, the control portion 112 may change the control method in the control operation according to the variation of the evaluation value S.

MODIFIED EXAMPLE

The above-described electricity supply systems 1, 100 of the first to third embodiments are provided with the electricity generation portions 10, 110, respectively, but if they are configured to be provided with a portion (an electricity supply portion) capable of supplying electricity to the load portions 11, 111, the electricity supply systems 1, 100 do not need to be provided with the electricity generation portions 10, 110. For example, the electricity supply system 1 of the first embodiment may be provided with an electricity storage portion instead of the electricity generation portion 10. However, this power supply portion should be capable of supplying electricity to an electricity system (not only physically but also socially, that is, for example, by being legally allowed).

Besides, in the electricity supply systems 1, 100 of the first to third embodiments, part or all of the operations of the control portions 12, 112, the electricity generation portions 10, 110, the load portions 11, 111, the electricity storage portion 114, and the recording portions 13, 113 may be performed by a control device such as a micon. Furthermore, all or part of the functions realized by such a control device may be prepared in the form of a computer program so that those functions—all or part—are realized as the computer program is executed on a program execution apparatus (for example, a computer).

Besides, in addition to the above cases, it is possible to realize the electricity supply systems 1, 100 with hardware or with a combination of hardware and software. In a case in which part of the electricity supply systems 1, 100 is realized by using software, a block for a portion realized by the software serves as a functional block of the portion.

It should be understood that the embodiments of the present invention specifically described above are not meant to limit the present invention, and that many variations and modifications can be made within the spirit of the present invention.

INDUSTRIAL APPLICABILITY

The present invention is applicable to an electricity supply system for supplying electricity.

LIST OF REFERENCE SYMBOLS 1,100 electricity supply system
10,110 electricity generation portion
11,111 load portion
12,112 control portion
13,113 recording portion
14,114 electricity storage portion

The invention claimed is:

1. An electricity supply system, comprising:
a power supply portion which supplies electricity, wherein a load consumes at least one of electricity supplied from the electricity supply portion and electricity supplied from an electricity system; and
an electricity amount determining portion which determines an amount of electricity to be supplied from the electricity supply portion and an amount of electricity to be consumed by the load, wherein
the electricity supply portion is capable of supplying electricity to the electricity system; and
the electricity amount determining portion determines, based on values of a plurality of electricities that the electricity supply system deals with, the amount of electricity to be supplied from the electricity supply portion and the amount of electricity to be consumed by the load.

2. The electricity supply system according to claim 1, wherein
the electricity amount determining portion determines an amount of electricity to be supplied from the electricity supply portion to the electricity system, and, based on the amount of electricity, the electricity amount determining portion determines an amount of another electricity.

3. The electricity supply system according to claim 2, wherein
a value of the system electricity varies depending on time; and
the electricity amount determining portion so determines an amount of electricity to be supplied to the load as to make the load perform, in a time period when the value of the system electricity is comparatively low, a predetermined operation having been scheduled to be performed in a time period when the value of the system electricity is comparatively high.

4. The electricity supply system according to claim 1, wherein
the electricity amount determining portion is capable of changing an amount of electricity to be supplied from the electricity supply portion and an amount of electricity to be supplied to the load in a case where the values of the plurality of electricities that the electricity supply system deals with vary.

5. The electricity supply system according to claim 4, wherein
the electricity amount determining portion has:
a first mode where the electricity amount determining portion determines with priority the amount of electricity to be supplied to the electricity system; and a second mode where the electricity amount determining portion determines with priority the amount of electricity to be supplied to the load; and the changing of the amount of electricity is performed by switching between the first mode and the second mode based on a variation of the values of the plurality of electricities that the electricity supply system deals with.

6. The electricity supply system according to claim 1, further comprising a control portion which controls an operation of the electricity supply portion and an operation of the load based on a determination made by the electricity amount determining portion.

7. The electricity supply system according to claim 6, further comprising an electricity storage portion which is controlled by the control portion, which also controls the operation of the electricity supply portion and the operation of the load based on the determination made by the electricity amount determining portion, wherein the electricity storage portion is charged by consuming at least one of electricity that is supplied from the electricity supply portion and the system electricity, and the electricity storage portion discharges to supply electricity.

8. The electricity supply system according to claim 1, wherein the determined amount of electricity to be supplied from the electricity supply portion and the determined amount of electricity to be consumed by the load are displayed.

* * * * *